US012669784B2

(12) United States Patent
Davis

(10) Patent No.: US 12,669,784 B2
(45) Date of Patent: Jun. 30, 2026

(54) CROWN SENSING SYSTEM FOR AN ELECTRONIC WATCH

(71) Applicant: Apple Inc., Cupertino, CA (US)

(72) Inventor: Richard A. Davis, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 401 days.

(21) Appl. No.: 18/126,348

(22) Filed: Mar. 24, 2023

(65) Prior Publication Data

US 2024/0319677 A1 Sep. 26, 2024

(51) Int. Cl.

| | |
|---|---|
| ***G04G 17/02*** | (2006.01) |
| ***G04G 17/08*** | (2006.01) |
| ***G04G 21/00*** | (2010.01) |
| ***G04G 21/02*** | (2010.01) |
| ***G04G 21/08*** | (2010.01) |

(52) U.S. Cl.

CPC ............. *G04G 17/02* (2013.01); *G04G 17/08* (2013.01); *G04G 21/025* (2013.01); *G04G 21/08* (2013.01); *G04G 21/00* (2013.01)

(58) Field of Classification Search

None

See application file for complete search history.

(56) References Cited

U.S. PATENT DOCUMENTS

| | | | |
|---|---|---|---|
| 2,237,860 | A | 4/1941 | Bolle |
| 2,288,215 | A | 6/1942 | Taubert et al. |
| 2,497,935 | A | 2/1950 | Feurer |
| 2,771,734 | A | 11/1956 | Morf |
| 2,788,236 | A | 4/1957 | Kafowi |
| 2,797,592 | A | 7/1957 | Marrapese |
| 3,040,514 | A | 6/1962 | Dinstman |
| 3,056,030 | A | 9/1962 | Kelchner |
| 3,130,539 | A | 4/1964 | Davis |
| 3,355,873 | A | 12/1967 | Morf |
| 3,362,154 | A | 1/1968 | Perret |

(Continued)

FOREIGN PATENT DOCUMENTS

| | | |
|---|---|---|
| AU | 2017228696 | 10/2017 |
| CH | 1888928 | 1/1937 |

(Continued)

OTHER PUBLICATIONS

Translation of EP 3835887 (Year: 2025).*

(Continued)

*Primary Examiner* — Regis J Betsch

*Assistant Examiner* — Michael James Walker

(74) *Attorney, Agent, or Firm* — Brownstein Hyatt Farber Schreck, LLP

(57) ABSTRACT

Embodiments are directed to an electronic watch that includes a housing defining a side wall and a display positioned at least partially in the housing. The electronic watch can include an input system that includes a mounting bracket coupled to the side wall, a crown coupled to the mounting bracket and configured to rotate and translate with respect to the housing and a flex plate coupled to the mounting bracket and configured to bend in response to translation of the crown. The input system can include a sensor element coupled to the flex plate and configured to output a signal indicating an amount of the bend of the flex plate.

20 Claims, 7 Drawing Sheets

(56) References Cited

U.S. PATENT DOCUMENTS

| | | | |
|---|---|---|---|
| 3,410,247 | A | 11/1968 | Dronberger |
| 3,495,398 | A | 2/1970 | Widmer et al. |
| 3,577,876 | A | 5/1971 | Spadini |
| 3,621,649 | A | 11/1971 | Vulcan et al. |
| 3,662,618 | A | 5/1972 | Kroll et al. |
| 3,733,803 | A | 5/1973 | Hiraga |
| 3,937,002 | A | 2/1976 | Haften |
| 4,007,347 | A | 2/1977 | Haber |
| 4,031,341 | A | 6/1977 | Wuthrich et al. |
| 4,037,068 | A | 7/1977 | Gaynor |
| 4,051,665 | A | 10/1977 | Arn |
| 4,077,200 | A | 3/1978 | Schneider |
| 4,133,404 | A | 1/1979 | Griffin |
| 4,170,104 | A | 10/1979 | Yamagata |
| 4,258,096 | A | 3/1981 | LaMarche |
| 4,274,152 | A | 6/1981 | Ikegami |
| 4,287,400 | A | 9/1981 | Kitik |
| 4,289,400 | A | 9/1981 | Kubola et al. |
| 4,311,026 | A | 1/1982 | Ochoa |
| 4,311,990 | A | 1/1982 | Burke |
| 4,324,956 | A | 4/1982 | Sakakino et al. |
| 4,345,119 | A | 8/1982 | Latasiewicz |
| 4,364,674 | A | 12/1982 | Tesch |
| 4,379,642 | A | 4/1983 | Meyrat |
| 4,395,134 | A | 7/1983 | Luce |
| 4,396,298 | A | 8/1983 | Ripley |
| 4,417,824 | A | 11/1983 | Paterson et al. |
| 4,448,199 | A | 5/1984 | Schmid |
| 4,520,306 | A | 5/1985 | Kirby |
| 4,581,509 | A | 4/1986 | Sanford et al. |
| 4,600,316 | A | 7/1986 | Besson |
| 4,617,461 | A | 10/1986 | Subbarao et al. |
| 4,634,861 | A | 1/1987 | Ching et al. |
| 4,641,026 | A | 2/1987 | Garcia, Jr. |
| 4,670,737 | A | 6/1987 | Rilling |
| 4,766,642 | A | 8/1988 | Gaffney et al. |
| 4,783,772 | A | 11/1988 | Umemoto et al. |
| 4,884,073 | A | 11/1989 | Souloumiac |
| 4,914,831 | A | 4/1990 | Kanezashi et al. |
| 4,922,070 | A | 5/1990 | Dorkinski |
| 4,931,794 | A | 6/1990 | Haag |
| 4,952,799 | A | 8/1990 | Loewen |
| 4,980,685 | A | 12/1990 | Souloumiac et al. |
| 4,987,299 | A | 1/1991 | Kobayashi et al. |
| 5,001,687 | A | 3/1991 | Brien |
| 5,034,602 | A | 7/1991 | Garcia et al. |
| 5,177,355 | A | 1/1993 | Branan |
| 5,214,278 | A | 5/1993 | Banda |
| 5,258,592 | A | 11/1993 | Nishikawa et al. |
| 5,288,993 | A | 2/1994 | Bidiville et al. |
| 5,347,123 | A | 9/1994 | Jackson et al. |
| 5,383,166 | A | 1/1995 | Gallay |
| 5,471,054 | A | 11/1995 | Watanabe |
| 5,477,508 | A | 12/1995 | Will |
| 5,509,174 | A | 4/1996 | Worrell |
| 5,559,761 | A | 9/1996 | Frenkel et al. |
| 5,572,314 | A | 11/1996 | Hyman et al. |
| 5,583,560 | A | 12/1996 | Florin et al. |
| 5,631,881 | A | 5/1997 | Pessey et al. |
| 5,726,645 | A | 3/1998 | Kamon et al. |
| 5,738,104 | A | 4/1998 | Lo |
| 5,748,111 | A | 5/1998 | Bates |
| 5,825,353 | A | 10/1998 | Will |
| 5,841,050 | A | 11/1998 | Clift et al. |
| 5,847,335 | A | 12/1998 | Sugahara et al. |
| 5,867,082 | A | 2/1999 | Van Zeeland |
| 5,943,233 | A | 8/1999 | Ebina |
| 5,953,001 | A | 9/1999 | Challener et al. |
| 5,960,366 | A | 9/1999 | Duwaer et al. |
| 5,963,332 | A | 10/1999 | Feldman et al. |
| 5,999,168 | A | 12/1999 | Rosenberg et al. |
| 6,069,567 | A | 5/2000 | Zawilski |
| 6,128,006 | A | 10/2000 | Rosenberg et al. |
| 6,134,189 | A | 10/2000 | Carrard |
| 6,154,201 | A | 11/2000 | Levin et al. |
| 6,175,679 | B1 | 1/2001 | Veligdan et al. |
| 6,203,190 | B1 | 3/2001 | Stotz |
| 6,241,684 | B1 | 6/2001 | Amano |
| 6,246,050 | B1 | 6/2001 | Tullis et al. |
| 6,252,825 | B1 | 6/2001 | Perotto |
| 6,304,247 | B1 | 10/2001 | Black |
| 6,355,891 | B1 | 3/2002 | Ikunami |
| 6,361,502 | B1 | 3/2002 | Puolakanaho et al. |
| 6,377,239 | B1 | 4/2002 | Isikawa |
| 6,392,640 | B1 | 5/2002 | Will |
| 6,396,006 | B1 | 5/2002 | Yokoji et al. |
| 6,422,740 | B1 | 7/2002 | Leuenberger |
| 6,477,117 | B1 | 11/2002 | Narayanaswami et al. |
| 6,502,982 | B1 | 1/2003 | Bach et al. |
| 6,525,278 | B2 | 2/2003 | Villain et al. |
| 6,556,222 | B1 | 4/2003 | Narayanaswami |
| 6,575,618 | B1 | 6/2003 | Inoue et al. |
| 6,587,400 | B1 | 7/2003 | Line |
| 6,636,197 | B1 | 10/2003 | Goldenberg et al. |
| 6,646,635 | B2 | 11/2003 | Pogatetz et al. |
| 6,661,438 | B1 | 12/2003 | Shiraishi et al. |
| 6,672,758 | B2 | 1/2004 | Ehrsam et al. |
| 6,794,992 | B1 | 9/2004 | Rogers |
| 6,809,275 | B1 | 10/2004 | Cheng et al. |
| 6,834,430 | B2 | 12/2004 | Worrell |
| 6,846,998 | B2 | 1/2005 | Hasumi et al. |
| 6,882,596 | B2 | 4/2005 | Guanter |
| 6,888,076 | B2 | 5/2005 | Hetherington |
| 6,896,403 | B1 | 5/2005 | Gau |
| 6,909,378 | B1 | 6/2005 | Lambrechts et al. |
| 6,914,551 | B2 | 7/2005 | Vidal |
| 6,950,695 | B2 | 9/2005 | Chen |
| 6,961,099 | B2 | 11/2005 | Takano et al. |
| 6,963,039 | B1 | 11/2005 | Weng et al. |
| 6,967,903 | B2 | 11/2005 | Guanter |
| 6,977,868 | B2 | 12/2005 | Brewer et al. |
| 6,982,930 | B1 | 1/2006 | Hung |
| 6,985,107 | B2 | 1/2006 | Anson |
| 6,987,568 | B2 | 1/2006 | Dana |
| 6,998,553 | B2 | 2/2006 | Hisamune et al. |
| 7,009,915 | B2 | 3/2006 | Brewer et al. |
| 7,016,263 | B2 | 3/2006 | Gueissaz et al. |
| 7,021,442 | B2 | 4/2006 | Borgerson |
| 7,022,974 | B2 | 4/2006 | Igaki et al. |
| 7,031,228 | B2 | 4/2006 | Born et al. |
| 7,034,237 | B2 | 4/2006 | Ferri et al. |
| 7,081,905 | B1 | 7/2006 | Raghunath et al. |
| 7,102,626 | B2 | 9/2006 | Denny, III |
| 7,106,307 | B2 | 9/2006 | Cok |
| 7,111,365 | B1 | 9/2006 | Howie, Jr. |
| 7,113,450 | B2 | 9/2006 | Plancon et al. |
| 7,119,289 | B2 | 10/2006 | Lacroix |
| 7,135,673 | B2 | 11/2006 | Saint Clair |
| 7,167,083 | B2 | 1/2007 | Giles |
| 7,187,359 | B2 | 3/2007 | Numata |
| 7,244,927 | B2 | 7/2007 | Huynh |
| 7,255,473 | B2 | 8/2007 | Hiranuma et al. |
| 7,265,336 | B2 | 9/2007 | Hataguchi et al. |
| 7,274,303 | B2 | 9/2007 | Dresti et al. |
| 7,285,738 | B2 | 10/2007 | Lavigne et al. |
| 7,286,063 | B2 | 10/2007 | Gauthey |
| 7,292,741 | B2 | 11/2007 | Ishiyama et al. |
| 7,358,481 | B2 | 4/2008 | Yeoh et al. |
| 7,369,308 | B2 | 5/2008 | Tsuruta et al. |
| 7,371,745 | B2 | 5/2008 | Ebright et al. |
| 7,385,874 | B2 | 6/2008 | Vuilleumier |
| 7,404,667 | B2 | 7/2008 | Born et al. |
| 7,465,917 | B2 | 12/2008 | Chin et al. |
| 7,468,036 | B1 | 12/2008 | Rulkov et al. |
| 7,474,592 | B2 | 1/2009 | Lyon |
| 7,506,269 | B2 | 3/2009 | Lang et al. |
| 7,520,664 | B2 | 4/2009 | Wai |
| 7,528,824 | B2 | 5/2009 | Kong |
| 7,545,367 | B2 | 6/2009 | Sunda et al. |
| 7,557,795 | B2 | 7/2009 | Kong et al. |
| 7,591,582 | B2 | 9/2009 | Hiranuma et al. |
| 7,593,755 | B2 | 9/2009 | Colando et al. |
| 7,605,846 | B2 | 10/2009 | Watanabe |
| 7,634,263 | B2 | 12/2009 | Louch et al. |

(56) References Cited

U.S. PATENT DOCUMENTS 7,646,677 B2 1/2010 Nakamura
7,655,874 B2 2/2010 Akieda
7,682,070 B2 3/2010 Burton
7,708,457 B2 5/2010 Girardin
7,710,456 B2 5/2010 Koshiba et al.
7,732,724 B2 6/2010 Otani et al.
7,761,246 B2 7/2010 Matsui
7,763,819 B2 7/2010 Leda et al.
7,772,507 B2 8/2010 Orr
7,778,115 B2 8/2010 Ruchonnet
7,781,726 B2 8/2010 Matsui et al.
RE41,637 E 9/2010 O'Hara et al.
7,791,587 B2 9/2010 Kosugi
7,791,588 B2 9/2010 Tierling et al.
7,791,597 B2 9/2010 Silverstein et al.
7,822,469 B2 10/2010 Lo
7,856,255 B2 12/2010 Tsuchiya et al.
7,858,583 B2 12/2010 Schmidt et al.
7,865,324 B2 1/2011 Lindberg
7,894,957 B2 2/2011 Carlson
7,920,249 B2 4/2011 Heinks et al.
7,946,758 B2 5/2011 Mooring
8,063,892 B2 11/2011 Shahoian et al.
8,138,488 B2 3/2012 Grot
8,139,035 B2 3/2012 Strawn et al.
8,143,981 B2 3/2012 Washizu et al.
8,167,126 B2 5/2012 Stiehl
8,169,402 B2 5/2012 Shahoian et al.
8,188,989 B2 5/2012 Levin et al.
8,195,313 B1 6/2012 Fadell et al.
8,220,987 B2 7/2012 Kimura et al.
8,229,535 B2 7/2012 Mensinger et al.
8,248,815 B2 8/2012 Yang et al.
8,263,886 B2 9/2012 Lin et al.
8,263,889 B2 9/2012 Takahashi et al.
8,275,327 B2 9/2012 Yi et al.
8,294,670 B2 10/2012 Griffin et al.
8,312,495 B2 11/2012 Vanderhoff
8,318,340 B2 11/2012 Stimits
8,368,677 B2 2/2013 Yamamoto
8,371,745 B2 2/2013 Manni
8,373,661 B2 2/2013 Lan et al.
8,405,618 B2 3/2013 Colgate
8,410,971 B2 4/2013 Friedlander
8,432,368 B2 4/2013 Momeyer et al.
8,439,559 B2 5/2013 Luk et al.
8,441,450 B2 5/2013 Degner et al.
8,446,713 B2 5/2013 Lai
8,456,430 B2 6/2013 Oliver et al.
8,477,118 B2 7/2013 Lan et al.
8,493,190 B2 7/2013 Periquet et al.
8,508,511 B2 8/2013 Tanaka et al.
8,525,777 B2 9/2013 Stavely et al.
8,562,489 B2 10/2013 Burton et al.
8,568,313 B2 10/2013 Sadhu
8,576,044 B2 11/2013 Chapman
8,593,598 B2 11/2013 Chen et al.
8,607,662 B2 12/2013 Huang
8,614,881 B2 12/2013 Yoo
8,624,836 B1 1/2014 Miller et al.
8,666,682 B2 3/2014 LaVigne et al.
8,677,285 B2 3/2014 Tsern et al.
8,704,787 B2 4/2014 Yamamoto
8,711,093 B2 4/2014 Ong et al.
8,717,151 B2 5/2014 Forutanpour et al.
8,724,087 B2 5/2014 Van De Kerkhof et al.
8,730,167 B2 5/2014 Ming et al.
8,735,747 B2 5/2014 Bigand
8,743,088 B2 6/2014 Watanabe
8,783,944 B2 7/2014 Doi
8,797,153 B2 8/2014 Vanhelle et al.
8,804,993 B2 8/2014 Shukla et al.
8,810,514 B2 8/2014 Zhao et al.
8,816,962 B2 8/2014 Obermeyer et al.
8,824,245 B2 9/2014 Lau et al.
8,847,741 B2 9/2014 Birnbaum et al.
8,851,372 B2 10/2014 Zhou
8,859,971 B2 10/2014 Weber
8,860,674 B2 10/2014 Lee et al.
8,863,219 B2 10/2014 Brown et al.
D717,679 S 11/2014 Anderssen
8,878,657 B2 11/2014 Periquet et al.
8,885,856 B2 11/2014 Sacha
8,895,911 B2 11/2014 Takahashi
8,905,631 B2 12/2014 Sakurazawa et al.
8,908,477 B2 12/2014 Peters
8,920,022 B2 12/2014 Ishida et al.
8,922,399 B2 12/2014 Bajaj et al.
8,928,452 B2 1/2015 Kim et al.
8,948,832 B2 2/2015 Hong et al.
8,954,135 B2 2/2015 Yuen et al.
8,975,543 B2 3/2015 Hakemeyer
8,994,827 B2 3/2015 Mistry et al.
9,001,625 B2 4/2015 Essery et al.
9,024,733 B2 5/2015 Wouters
9,028,134 B2 5/2015 Koshoji et al.
9,030,446 B2 5/2015 Mistry et al.
9,034,666 B2 5/2015 Vaganov et al.
9,039,614 B2 5/2015 Yuen et al.
9,041,663 B2 5/2015 Westerman
9,042,971 B2 5/2015 Brumback et al.
9,049,998 B2 6/2015 Brumback et al.
9,052,696 B2 6/2015 Breuillot et al.
9,086,717 B2 7/2015 Meerovitsch
9,086,738 B2 7/2015 Leung et al.
9,091,309 B2 7/2015 Battlogg
9,100,493 B1 8/2015 Zhou
9,101,184 B2 8/2015 Wilson
9,105,413 B2 8/2015 Hiranuma et al.
9,123,483 B2 9/2015 Ferri et al.
9,134,807 B2 9/2015 Shaw et al.
9,141,087 B2 9/2015 Brown et al.
9,176,577 B2 11/2015 Jangaard et al.
9,176,598 B2 11/2015 Sweetser et al.
9,202,372 B2 12/2015 Reams et al.
9,213,409 B2 12/2015 Redelsheimer et al.
9,223,296 B2 12/2015 Yang et al.
9,241,635 B2 1/2016 Yuen et al.
9,244,438 B2 1/2016 Hoover et al.
9,256,209 B2 2/2016 Yang et al.
9,277,156 B2 3/2016 Bennett et al.
9,348,322 B2 5/2016 Fraser et al.
9,350,850 B2 5/2016 Pope et al.
9,367,146 B2 6/2016 Piot
9,386,932 B2 7/2016 Chatterjee et al.
9,426,275 B2 8/2016 Eim et al.
9,430,042 B2 8/2016 Levin
9,437,357 B2 9/2016 Furuki et al.
9,449,770 B2 9/2016 Sanford et al.
9,501,044 B2 11/2016 Jackson et al.
9,520,100 B2 12/2016 Houjou et al.
9,532,723 B2 1/2017 Kim
9,542,016 B2 1/2017 Armstrong-Muntner
9,545,541 B2 1/2017 Aragones et al.
9,552,023 B2 1/2017 Joo et al.
9,599,964 B2 3/2017 Gracia
9,600,071 B2 3/2017 Rothkopf
9,606,721 B2 3/2017 Park et al.
9,607,505 B2 3/2017 Rothkopf et al.
9,620,312 B2 4/2017 Ely et al.
9,627,163 B2 4/2017 Ely
9,632,318 B2 4/2017 Goto et al.
9,632,537 B2 4/2017 Memering
9,638,587 B2 5/2017 Marquas et al.
9,651,922 B2 5/2017 Hysek et al.
9,659,482 B2 5/2017 Yang et al.
9,680,831 B2 6/2017 Jooste et al.
9,709,956 B1 7/2017 Ely et al.
9,753,436 B2 9/2017 Ely et al.
D800,172 S 10/2017 Akana
9,800,717 B2 10/2017 Ma et al.
9,836,025 B2 12/2017 Ely et al.
9,873,711 B2 1/2018 Hoover et al.
9,874,945 B2 1/2018 Fukumoto

(56) References Cited

U.S. PATENT DOCUMENTS 9,886,006 B2 2/2018 Ely et al.
9,891,590 B2 2/2018 Shim et al.
9,891,651 B2 2/2018 Jackson et al.
9,891,667 B2 2/2018 Jung et al.
9,898,032 B2 2/2018 Hafez et al.
9,913,591 B2 3/2018 Lapetina et al.
9,921,548 B2 3/2018 Mitani
9,927,902 B2 3/2018 Burr et al.
9,939,923 B2 4/2018 Sharma
9,946,297 B2 4/2018 Nazzaro et al.
9,952,558 B2 4/2018 Ely
9,952,682 B2 4/2018 Zhang et al.
9,971,305 B2 5/2018 Ely et al.
9,971,405 B2 5/2018 Salo et al.
9,971,407 B2 5/2018 Holenarsipur et al.
9,979,426 B2 5/2018 Na et al.
10,001,817 B2 6/2018 Zambetti et al.
10,012,550 B2 7/2018 Yang
10,018,966 B2 7/2018 Ely et al.
10,019,097 B2 7/2018 Ely et al.
10,037,006 B2 7/2018 Ely
10,037,081 B2 7/2018 Grant
10,048,802 B2 8/2018 Shedletsky
10,057,470 B2 8/2018 Kim et al.
10,061,399 B2 8/2018 Bushnell et al.
10,066,970 B2 9/2018 Gowreesunker et al.
10,092,203 B2 10/2018 Mirov
10,108,016 B2 10/2018 Bosveld
10,114,342 B2 10/2018 Kim et al.
10,145,711 B2 12/2018 Boonsom et al.
10,175,652 B2 1/2019 Ely et al.
10,190,891 B1 1/2019 Rothkopf et al.
10,191,455 B2 1/2019 Shim et al.
10,203,662 B1 2/2019 Lin et al.
10,209,148 B2 2/2019 Lyon et al.
10,216,147 B2 2/2019 Ely et al.
10,222,755 B2 3/2019 Coakley et al.
10,222,756 B2 3/2019 Ely et al.
10,222,909 B2 3/2019 Shedletsky et al.
10,234,828 B2 3/2019 Ely et al.
10,241,593 B2 3/2019 Chen
10,274,905 B2 4/2019 Chung
10,275,052 B2 4/2019 Kang
10,296,125 B2 5/2019 Ely et al.
10,331,081 B2 6/2019 Ely et al.
10,331,082 B2 6/2019 Ely et al.
10,332,111 B2 6/2019 Mokhasi et al.
10,353,487 B2 7/2019 Chung et al.
10,379,629 B2 8/2019 Bushnell et al.
10,386,940 B2 8/2019 Kim
10,401,961 B2 9/2019 Cruz-Hernandez et al.
10,429,959 B2 10/2019 Battlogg
10,444,040 B2 10/2019 Ruh
10,474,194 B1 11/2019 Ell et al.
10,503,258 B2 12/2019 Holenarsipur et al.
10,509,486 B2 12/2019 Bushnell et al.
10,524,671 B2 1/2020 Lamego
10,534,320 B2 1/2020 Ferri et al.
10,534,900 B2 1/2020 Cheong et al.
10,551,798 B1 2/2020 Bushnell et al.
10,572,053 B2 2/2020 Ely et al.
10,579,090 B2 3/2020 Jackson et al.
10,593,617 B2 3/2020 Ashikaga et al.
10,599,101 B2 3/2020 Rothkopf et al.
10,610,157 B2 4/2020 Pandya et al.
10,613,685 B2 4/2020 Shedletsky
10,627,783 B2 4/2020 Rothkopf et al.
10,655,988 B2 5/2020 Boonsom et al.
10,664,074 B2 5/2020 Moussette et al.
10,732,571 B2 8/2020 Ely et al.
10,765,019 B2 9/2020 Werner
10,840,041 B1 11/2020 Harms
10,845,764 B2 11/2020 Ely et al.
10,852,700 B2 12/2020 Abramov
10,852,855 B2 12/2020 Niu
10,871,385 B2 12/2020 Kok
10,884,549 B2 1/2021 Shedletsky et al.
10,936,071 B2 3/2021 Pandya et al.
10,942,491 B2 3/2021 Rothkopf
10,948,880 B2 3/2021 Ely et al.
10,955,937 B2 3/2021 Bushnell et al.
10,962,930 B2 3/2021 Ely et al.
10,962,935 B1 3/2021 Ely et al.
10,987,054 B2 4/2021 Pandya et al.
11,000,193 B2 5/2021 Tal et al.
11,002,572 B2 5/2021 Boonsom et al.
11,016,447 B2 * 5/2021 Zanesco ................. G04G 21/00
11,029,831 B2 6/2021 Block et al.
11,036,318 B2 6/2021 Bokma et al.
11,085,945 B2 8/2021 Joet
11,148,292 B2 10/2021 Bryner et al.
11,181,863 B2 11/2021 Ely et al.
11,194,298 B2 12/2021 Roach et al.
11,194,299 B1 12/2021 Herrera
11,209,777 B2 12/2021 Minakuchi et al.
11,209,783 B2 12/2021 Bushnell et al.
11,221,590 B2 1/2022 Rothkopf et al.
11,347,189 B1 5/2022 Herrera et al.
11,347,351 B2 5/2022 Shedletsky et al.
11,350,869 B2 6/2022 Rasmussen et al.
11,360,440 B2 6/2022 Perkins et al.
11,385,599 B2 7/2022 Ely et al.
11,474,483 B2 10/2022 Rothkopf
11,513,613 B2 11/2022 Bushnell et al.
11,531,306 B2 12/2022 Ely et al.
11,537,082 B2 12/2022 Ferri et al.
11,550,268 B2 1/2023 Pandya et al.
11,556,095 B2 1/2023 Hiemstra et al.
11,561,515 B2 1/2023 Beyhs
11,567,457 B2 1/2023 Rothkopf et al.
11,669,205 B2 6/2023 Shedletsky et al.
11,720,064 B2 8/2023 Ely
11,754,981 B2 9/2023 Perkins et al.
11,762,342 B2 9/2023 Rothkopf et al.
11,796,961 B2 10/2023 Ely et al.
11,815,860 B2 11/2023 Pandya et al.
11,860,587 B2 1/2024 Taylor et al.
12,045,416 B2 7/2024 Shedletsky et al.
12,092,996 B2 9/2024 Herrera et al.
12,105,480 B2 10/2024 Perkins et al.
12,181,840 B2 12/2024 Ely et al.
12,276,943 B2 4/2025 Ely et al.
2002/0101457 A1 8/2002 Lang
2003/0174590 A1 9/2003 Arikawa et al.
2004/0047244 A1 3/2004 Iino et al.
2004/0082414 A1 4/2004 Knox
2004/0130971 A1 7/2004 Ecoffet et al.
2004/0264301 A1 12/2004 Howard et al.
2005/0075558 A1 4/2005 Vecerina et al.
2005/0088417 A1 4/2005 Mulligan
2006/0002653 A1 1/2006 Grunnet-Jepsen et al.
2006/0250377 A1 11/2006 Zadesky et al.
2007/0013775 A1 1/2007 Shin
2007/0050054 A1 3/2007 Sambandam Guruparan et al.
2007/0182708 A1 8/2007 Poupyrev et al.
2007/0211042 A1 9/2007 Kim et al.
2007/0222756 A1 9/2007 Wu et al.
2007/0229671 A1 10/2007 Takeshita et al.
2007/0242569 A1 10/2007 Inoue
2007/0247421 A1 10/2007 Orsley et al.
2008/0130914 A1 6/2008 Cho
2009/0051649 A1 2/2009 Rondel
2009/0073119 A1 3/2009 Le et al.
2009/0122656 A1 5/2009 Bonnet et al.
2009/0146975 A1 6/2009 Chang
2009/0152452 A1 6/2009 Lee et al.
2009/0217207 A1 8/2009 Kagermeier et al.
2009/0285443 A1 11/2009 Camp et al.
2009/0312051 A1 12/2009 Hansson et al.
2010/0033430 A1 2/2010 Kakutani et al.
2010/0053468 A1 3/2010 Havrill
2010/0081375 A1 4/2010 Rosenblatt et al.
2010/0149099 A1 6/2010 Elias
2011/0007468 A1 1/2011 Burton et al.

(56) References Cited

U.S. PATENT DOCUMENTS

| | | | |
|---|---|---|---|
| 2011/0090148 | A1 | 4/2011 | Li et al. |
| 2011/0158057 | A1 | 6/2011 | Brewer et al. |
| 2011/0242064 | A1 | 10/2011 | Ono et al. |
| 2011/0270358 | A1 | 11/2011 | Davis et al. |
| 2012/0067711 | A1 | 3/2012 | Yang |
| 2012/0068857 | A1 | 3/2012 | Rothkopf et al. |
| 2012/0075082 | A1 | 3/2012 | Rothkopf et al. |
| 2012/0112859 | A1 | 5/2012 | Park et al. |
| 2012/0113044 | A1 | 5/2012 | Strazisar et al. |
| 2012/0206248 | A1 | 8/2012 | Biggs |
| 2012/0272784 | A1 | 11/2012 | Bailey et al. |
| 2013/0037396 | A1 | 2/2013 | Yu |
| 2013/0087443 | A1 | 4/2013 | Kikuchi |
| 2013/0191220 | A1 | 7/2013 | Dent et al. |
| 2013/0235704 | A1 | 9/2013 | Grinberg |
| 2013/0261405 | A1 | 10/2013 | Lee et al. |
| 2013/0335196 | A1 | 12/2013 | Zhang et al. |
| 2014/0009397 | A1 | 1/2014 | Gillespie |
| 2014/0045547 | A1 | 2/2014 | Singamsetty et al. |
| 2014/0071098 | A1 | 3/2014 | You |
| 2014/0073486 | A1 | 3/2014 | Ahmed et al. |
| 2014/0132516 | A1 | 5/2014 | Tsai et al. |
| 2014/0143784 | A1 | 5/2014 | Mistry |
| 2014/0197936 | A1 | 7/2014 | Biggs et al. |
| 2014/0368442 | A1 | 12/2014 | Vahtola |
| 2014/0375579 | A1 | 12/2014 | Fujiwara |
| 2015/0049059 | A1 | 2/2015 | Zadesky et al. |
| 2015/0098309 | A1 | 4/2015 | Adams et al. |
| 2015/0124415 | A1 | 5/2015 | Goyal et al. |
| 2015/0186609 | A1 | 7/2015 | Utter II |
| 2015/0293592 | A1 | 10/2015 | Cheong |
| 2015/0320346 | A1 | 11/2015 | Chen |
| 2015/0366098 | A1 | 12/2015 | Lapetina et al. |
| 2016/0018846 | A1 | 1/2016 | Zenoff |
| 2016/0147432 | A1 | 5/2016 | Shi et al. |
| 2016/0170624 | A1 | 6/2016 | Zambetti et al. |
| 2016/0241688 | A1 | 8/2016 | Vossoughi |
| 2016/0320583 | A1 | 11/2016 | Hall, Jr. |
| 2016/0327911 | A1 | 11/2016 | Eim et al. |
| 2016/0338642 | A1 | 11/2016 | Parara et al. |
| 2017/0027461 | A1 | 2/2017 | Shin et al. |
| 2017/0031449 | A1 | 2/2017 | Karsten et al. |
| 2017/0069443 | A1 | 3/2017 | Wang et al. |
| 2017/0069444 | A1 | 3/2017 | Wang et al. |
| 2017/0216519 | A1 | 8/2017 | Vouillamoz |
| 2017/0216668 | A1 | 8/2017 | Burton et al. |
| 2017/0319082 | A1 | 11/2017 | Sayme |
| 2018/0059624 | A1 | 3/2018 | James |
| 2018/0225701 | A1 | 8/2018 | Han |
| 2018/0235491 | A1 | 8/2018 | Bayley et al. |
| 2019/0025940 | A1 | 1/2019 | Shim et al. |
| 2019/0056700 | A1 | 2/2019 | Matsuno |
| 2019/0072911 | A1 | 3/2019 | Ely et al. |
| 2019/0317454 | A1 | 10/2019 | Holenarsipur et al. |
| 2020/0041962 | A1 | 2/2020 | Beyhs |
| 2020/0064779 | A1 | 2/2020 | Pandya et al. |
| 2020/0085331 | A1 | 3/2020 | Chou |
| 2020/0103972 | A1* | 4/2020 | Amin-Shahidi ...... G06F 3/0346 |
| 2020/0159172 | A1 | 5/2020 | Bushnell et al. |
| 2021/0055696 | A1 | 2/2021 | Ely |
| 2021/0173351 | A1* | 6/2021 | Vuille .................... G01D 5/142 |
| 2021/0181692 | A1 | 6/2021 | Rothkopf et al. |
| 2021/0255590 | A1 | 8/2021 | Ely et al. |
| 2021/0325168 | A1 | 10/2021 | Lv et al. |
| 2021/0353226 | A1 | 11/2021 | Hiemstra |
| 2021/0373501 | A1* | 12/2021 | Pandya .................. A61B 5/282 |
| 2022/0043397 | A1 | 2/2022 | Ely et al. |
| 2022/0074731 | A1 | 3/2022 | Jang et al. |
| 2023/0012897 | A1 | 1/2023 | Bushnell et al. |
| 2023/0028554 | A1 | 1/2023 | Rothkopf et al. |
| 2023/0097827 | A1 | 3/2023 | Rothkopf et al. |
| 2023/0101015 | A1 | 3/2023 | Ely et al. |
| 2023/0161299 | A1 | 5/2023 | Beyhs |
| 2023/0168635 | A1 | 6/2023 | Hiemstra et al. |
| 2023/0213893 | A1 | 7/2023 | Rothkopf et al. |
| 2023/0259235 | A1 | 8/2023 | Shedletsky et al. |
| 2023/0341819 | A1 | 10/2023 | Ely et al. |
| 2023/0393536 | A1 | 12/2023 | Perkins et al. |
| 2023/0400818 | A1 | 12/2023 | Davis et al. |
| 2023/0408984 | A1 | 12/2023 | Liang et al. |
| 2023/0418230 | A1 | 12/2023 | Ely et al. |
| 2024/0036523 | A1 | 2/2024 | Pandya et al. |
| 2024/0045383 | A1 | 2/2024 | Roach et al. |
| 2024/0053707 | A1 | 2/2024 | Ely et al. |
| 2024/0126219 | A1 | 4/2024 | Taylor et al. |
| 2024/0152100 | A1 | 5/2024 | Beyhs |
| 2024/0192804 | A1 | 6/2024 | Shedletsky et al. |
| 2024/0264568 | A1 | 8/2024 | Ely |
| 2024/0264569 | A1 | 8/2024 | Davis et al. |
| 2024/0393747 | A1 | 11/2024 | Ely et al. |
| 2025/0004426 | A1 | 1/2025 | Herrera et al. |
| 2025/0013202 | A1 | 1/2025 | Ely et al. |
| 2025/0013207 | A1 | 1/2025 | Perkins et al. |
| 2025/0093818 | A1 | 3/2025 | Ely et al. |
| 2025/0103008 | A1 | 3/2025 | Panya et al. |
| 2025/0109970 | A1 | 4/2025 | Chamakura et al. |
| 2025/0110580 | A1 | 4/2025 | Zhao et al. |
| 2025/0165101 | A1 | 5/2025 | Shedletsky et al. |
| 2025/0189933 | A1 | 6/2025 | Pandya et al. |
| 2025/0231532 | A1 | 7/2025 | Beyhs |

FOREIGN PATENT DOCUMENTS

| | | |
|---|---|---|
| CH | 715684 | 6/2020 |
| CN | 1302740 | 9/2001 |
| CN | 1445627 | 10/2003 |
| CN | 1504843 | 6/2004 |
| CN | 1601408 | 3/2005 |
| CN | 1624427 | 6/2005 |
| CN | 1792295 | 6/2006 |
| CN | 1825224 | 8/2006 |
| CN | 101035148 | 9/2007 |
| CN | 101201587 | 6/2008 |
| CN | 201081979 | 7/2008 |
| CN | 101404928 | 4/2009 |
| CN | 201262741 | 6/2009 |
| CN | 101641663 | 2/2010 |
| CN | 101750958 | 6/2010 |
| CN | 201638168 | 11/2010 |
| CN | 101923314 | 12/2010 |
| CN | 102067070 | 5/2011 |
| CN | 102216959 | 10/2011 |
| CN | 202008579 | 10/2011 |
| CN | 102543534 | 7/2012 |
| CN | 102590925 | 7/2012 |
| CN | 102741772 | 10/2012 |
| CN | 102890443 | 1/2013 |
| CN | 202710937 | 1/2013 |
| CN | 103177891 | 6/2013 |
| CN | 103191557 | 7/2013 |
| CN | 103253067 | 8/2013 |
| CN | 103645804 | 3/2014 |
| CN | 203564224 | 4/2014 |
| CN | 103852090 | 6/2014 |
| CN | 203630524 | 6/2014 |
| CN | 103919536 | 7/2014 |
| CN | 103956006 | 7/2014 |
| CN | 203693601 | 7/2014 |
| CN | 203705837 | 7/2014 |
| CN | 203732900 | 7/2014 |
| CN | 103995456 | 8/2014 |
| CN | 104020660 | 9/2014 |
| CN | 203941395 | 11/2014 |
| CN | 104777987 | 4/2015 |
| CN | 104685794 | 6/2015 |
| CN | 204479929 | 7/2015 |
| CN | 204496177 | 7/2015 |
| CN | 104880937 | 9/2015 |
| CN | 104898406 | 9/2015 |
| CN | 204650147 | 9/2015 |
| CN | 105022947 | 11/2015 |
| CN | 105096979 | 11/2015 |
| CN | 105339871 | 2/2016 |
| CN | 105446125 | 3/2016 |

(56) References Cited

FOREIGN PATENT DOCUMENTS

| | | | |
|---|---|---|---|
| CN | 205121417 | 3/2016 | |
| CN | 105547146 | 5/2016 | |
| CN | 105556433 | 5/2016 | |
| CN | 105683876 | 6/2016 | |
| CN | 105683877 | 6/2016 | |
| CN | 105760067 | 7/2016 | |
| CN | 105955519 | 9/2016 | |
| CN | 205645648 | 10/2016 | |
| CN | 205721636 | 11/2016 | |
| CN | 205750744 | 11/2016 | |
| CN | 106236051 | 12/2016 | |
| CN | 106557218 | 4/2017 | |
| CN | 206147524 | 5/2017 | |
| CN | 206209589 | 5/2017 | |
| CN | 107111342 | 8/2017 | |
| CN | 107122088 | 9/2017 | |
| CN | 107966895 | 4/2018 | |
| CN | 109144173 A | 1/2019 | |
| CN | 109389816 A | 2/2019 | |
| CN | 209560397 | 10/2019 | |
| CN | 209625187 | 11/2019 | |
| CN | 110865680 | 3/2020 | |
| CN | 111752138 | 10/2020 | |
| CN | 215494568 | 1/2022 | |
| CN | 114220694 | 3/2022 | |
| CN | 106125968 | 11/2022 | |
| CN | 218675709 | 3/2023 | |
| DE | 2352016 | 4/1975 | |
| DE | 3706194 | 9/1988 | |
| DE | 102008023651 | 11/2009 | |
| DE | 102016215087 | 3/2017 | |
| EP | 0165548 | 12/1985 | |
| EP | 0556155 | 8/1993 | |
| EP | 1345095 | 9/2003 | |
| EP | 1519452 | 3/2005 | |
| EP | 1669724 | 6/2006 | |
| EP | 1832969 | 9/2007 | |
| EP | 2375295 | 10/2011 | |
| EP | 2579186 | 4/2013 | |
| EP | 2720129 | 4/2014 | |
| EP | 2884239 | 6/2015 | |
| EP | 3835887 B1 * | 7/2022 | ............ G04C 3/002 |
| FR | 2030093 | 10/1970 | |
| FR | 2801402 | 5/2001 | |
| GB | 887369 | 1/1962 | |
| GB | 2433211 | 6/2007 | |
| JP | S52151058 | 12/1977 | |
| JP | S52164551 | 12/1977 | |
| JP | S53093067 | 8/1978 | |
| JP | S5478178 | 6/1979 | |
| JP | S54087779 | 6/1979 | |
| JP | S5708582 | 1/1982 | |
| JP | S5734457 | 2/1982 | |
| JP | S60103936 | 6/1985 | |
| JP | S60103937 | 6/1985 | |
| JP | H02285214 | 11/1990 | |
| JP | H04093719 | 3/1992 | |
| JP | H04157319 | 5/1992 | |
| JP | H05087955 | 4/1993 | |
| JP | H05203465 | 8/1993 | |
| JP | H05312595 | 11/1993 | |
| JP | H06050927 | 12/1994 | |
| JP | H06331761 | 12/1994 | |
| JP | H06347293 | 12/1994 | |
| JP | H07116141 | 5/1995 | |
| JP | H08211169 | 8/1996 | |
| JP | H0914941 | 1/1997 | |
| JP | H10161811 | 6/1998 | |
| JP | H11121210 | 4/1999 | |
| JP | H11191508 | 7/1999 | |
| JP | 2000258559 | 9/2000 | |
| JP | 2000316824 | 11/2000 | |
| JP | 2000337892 | 12/2000 | |
| JP | 2001084934 | 3/2001 | |
| JP | 2001167651 | 6/2001 | |

| | | |
|---|---|---|
| JP | 2001202178 | 7/2001 |
| JP | 2001215288 | 8/2001 |
| JP | 2001289977 | 10/2001 |
| JP | 2001524206 | 11/2001 |
| JP | 2002071480 | 3/2002 |
| JP | 2002165768 | 6/2002 |
| JP | 2003036144 | 2/2003 |
| JP | 2003050668 | 2/2003 |
| JP | 2003151410 | 5/2003 |
| JP | 2003215271 | 7/2003 |
| JP | 2003331693 | 11/2003 |
| JP | 2004079410 | 3/2004 |
| JP | 2004184396 | 7/2004 |
| JP | 2004028979 | 11/2004 |
| JP | 2005017011 | 1/2005 |
| JP | 2005063200 | 3/2005 |
| JP | 2005099023 | 4/2005 |
| JP | 2005108630 | 4/2005 |
| JP | 2006101505 | 4/2006 |
| JP | 2006164275 | 6/2006 |
| JP | 3852854 | 12/2006 |
| JP | 2007101380 | 4/2007 |
| JP | 2007149620 | 6/2007 |
| JP | 2007248176 | 9/2007 |
| JP | 2007285748 | 11/2007 |
| JP | 2007311153 | 11/2007 |
| JP | 2008053980 | 3/2008 |
| JP | 2008122124 | 5/2008 |
| JP | 2008122377 | 5/2008 |
| JP | 2008170436 | 7/2008 |
| JP | 2008235226 | 10/2008 |
| JP | 2009009382 | 1/2009 |
| JP | 2009070657 | 4/2009 |
| JP | 2009519737 | 5/2009 |
| JP | 2009540399 | 11/2009 |
| JP | 2010032545 | 2/2010 |
| JP | 2010515153 | 5/2010 |
| JP | 2010165001 | 7/2010 |
| JP | 2010186572 | 8/2010 |
| JP | 2010243344 | 10/2010 |
| JP | 2010244797 | 10/2010 |
| JP | 2011021929 | 2/2011 |
| JP | 2011165468 | 8/2011 |
| JP | 2011221659 | 11/2011 |
| JP | 2012053801 | 3/2012 |
| JP | 2012221905 | 11/2012 |
| JP | 2013057516 | 3/2013 |
| JP | 2013079961 | 5/2013 |
| JP | 2013524189 | 6/2013 |
| JP | 3190075 | 4/2014 |
| JP | 5477393 | 4/2014 |
| JP | 2014512556 | 5/2014 |
| JP | 2014112222 | 6/2014 |
| JP | 2014174031 | 9/2014 |
| JP | 2016532266 | 10/2016 |
| JP | 2017219448 | 12/2017 |
| JP | 2018510451 | 4/2018 |
| KR | 20010030477 | 4/2001 |
| KR | 200278568 | 3/2002 |
| KR | 20030083340 | 10/2003 |
| KR | 20070011685 | 1/2007 |
| KR | 20070014247 | 2/2007 |
| KR | 100754674 | 9/2007 |
| KR | 20080028935 | 4/2008 |
| KR | 20080045397 | 5/2008 |
| KR | 100849684 | 8/2008 |
| KR | 1020080111563 | 12/2008 |
| KR | 2020100007563 | 7/2010 |
| KR | 20110011393 | 2/2011 |
| KR | 20110012784 | 2/2011 |
| KR | 20110103761 | 9/2011 |
| KR | 20110113368 | 10/2011 |
| KR | 20130036038 | 4/2013 |
| KR | 20130131873 | 12/2013 |
| KR | 20140051391 | 4/2014 |
| KR | 20140064689 | 5/2014 |
| KR | 20140104388 | 8/2014 |
| KR | 20160017070 | 2/2016 |
| KR | 20160048967 | 5/2016 |

(56) References Cited

FOREIGN PATENT DOCUMENTS

| | | | | |
|---|---|---|---|---|
| KR | 20170106395 | | 9/2017 | |
| KR | 20170127744 | A | 11/2017 | |
| KR | 102136836 | | 7/2020 | |
| NL | 1040225 | | 11/2014 | |
| RO | 129033 | | 11/2013 | |
| TW | 200633681 | | 10/2006 | |
| WO | WO2001/022038 | | 3/2001 | |
| WO | WO2001/069567 | | 9/2001 | |
| WO | WO2003/032538 | | 4/2003 | |
| WO | WO2010/058376 | | 5/2010 | |
| WO | WO2012/083380 | | 6/2012 | |
| WO | WO2012/094805 | | 7/2012 | |
| WO | WO2014/018118 | | 1/2014 | |
| WO | WO2014/200766 | | 12/2014 | |
| WO | WO-2014200766 | A1 * | 12/2014 | ............ G04C 3/004 |
| WO | WO2015/034149 | | 3/2015 | |
| WO | WO2015/116111 | | 8/2015 | |
| WO | WO2015122885 | | 8/2015 | |
| WO | WO2015/147756 | | 10/2015 | |
| WO | WO2016080669 | | 5/2016 | |
| WO | WO2016/104922 | | 6/2016 | |
| WO | WO2016/155761 | | 10/2016 | |
| WO | WO2016196171 | | 12/2016 | |
| WO | WO2016208835 | | 12/2016 | |
| WO | WO2017/013278 | | 1/2017 | |
| WO | WO2019/050778 | | 3/2019 | |
| WO | WO2020173085 | | 9/2020 | |

OTHER PUBLICATIONS

Author Unknown, "Desirable Android Wear smartwatch from LG," Gulf News, Dubai, 3 pages, Jan. 30, 2015.

Author Unknown, "Fossil Q ups smartwatch game with handsome design and build," Business Mirror, Makati City, Philippines, 3 pages, Dec. 20, 2016.

Author Unknown, "How Vesag Helps Kids Women and Visitors," http://www.sooperarticles.com/health-fitness-articles/children-health-articles/how-vesag-helps-kids-women-visitors-218542.html, 2 pages, at least as early as May 20, 2015.

Author Unknown, "mHealth," http://mhealth.vesag.com/?m=201012, 7 pages, Dec. 23, 2010.

Author Unknown, "mHealth Summit 2010," http://www.virtualpressoffice.com/eventsSubmenu.do?page=exhibitorPage&showld= 1551&companyld=5394, 5 pages, Nov. 18, 2010.

Author Unknown, "MyKronoz ZeTime: World's Most Funded Hybrid Smartwatch Raised over $3M on Kickstarter, Running until April 27th," Business Wire, New York, New York, 3 pages, Apr. 21, 2017.

Author Unknown, "RedEye mini Plug-in Universal Remote Adapter for iPhone, iPod touch and iPad," Amazon.com, 4 pages, date unknown.

Author Unknown, "Re iPhone Universal Remote Control—Infrared Remote Control Accessory for iphone and ipod touch," http://www.amazon.com/iPhone-Universal-Remote-Control-Accessory/dp/tech-data/B0038Z4 ... , 2 pages, at least as early as Jul. 15, 2010.

Author Unknown, "Vesag Wrist Watch for Dementia Care from VYZIN," http://vyasa-kaaranam-ketkadey.blogspot.com/2011/03/vesag-wrist-watch-for-dementia-care.html, 2 pages, Mar. 31, 2011.

Author Unknown, "Vyzin Electronics Private Limited launches Vesag Watch," http://www.virtualpressoffice.com/showJointPage.do?page=jp&showld=1544, 5 pages, Jan. 6, 2011.

Author Unknown, "Vyzin Unveiled Personal Emergency Response System (PERS) with Remote Health Monitoring That Can Be Used for Entire Family," http://www.24- 7pressrelease.com/press-release/vyzin-unveiled-personal-emergency-response-system-pers-with-remote-health-monitoring-that-can-be-used-for-entire-family-219317.php, 2 pages, Jun. 17, 2011.

Author Unknown, "DeskThorityNet, Optical Switch Keyboards," http://deskthority.net/keyboards-f2/optical-switch-keyboards-t1474.html, 22 pages, Jul. 11, 2015.

Epstein et al., "Economical, High-Performance Optical Encoders," Hewlett-Packard Journal, pp. 99-106, Oct. 1988. [text only version].

Greyb, "Google Watch: Convert your arm into a keyboard," http://www.whatafuture.com/2014/02/28/google- smartwatch/#sthash.Yk35cDXK.dpbs, 3 pages, Feb. 28, 2014.

IBM, "Additional Functionality Added to Cell Phone via "Learning" Function Button," www.ip.com, 2 pages, Feb. 21, 2007.

Kim, Joseph, "2010 mHealth Summit Emerges as Major One-Stop U.S. Venue for Mobile Health," http://www.medicineandtechnology.com/2010/08/2010-mhealth-summit-emerges-as-major.html, 3 pages, Aug. 26, 2010.

Krishnan et al., "A Miniature Surface Mount Reflective Optical Shaft Encoder," Hewlett-Packard Journal, Article 8, pp. 1-6, Dec. 1996.

Narayanaswami et al., "Challenges and considerations for the design and production of a purpose-optimized body-worn wrist-watch computer," Defense, Security, and Cockpit Displays, 2004.

M.T. Raghunath et al., User Interfaces for Applications on a Wrist Watch, Personal and Ubiquitous Computing, vol. 6, No. 1, 2002, Springer.

Rick, "How VESAG Helps Health Conscious Citizens," http://sensetekgroup.com/2010/11/29/wireless-health-monitoring-system/, 2 pages, Nov. 29, 2010.

Sadhu, Rajendra, "How VESAG Helps People Who Want to 'Be There'?," http://ezinearticles.com/?How-Vesag-Helps-People-Who-Want-to-Be-There?&id- 5423873, 1 page, Nov. 22, 2010.

Sadhu, Rajendra, "Mobile Innovation Helps Dementia and Alzheimer's Patients," http://www.itnewsafrica.com/2010/11/mobile-innovation-helps-dementia-andalzheimer%E2%80%99s-patients/, 3 pages, Nov. 22, 2010.

Sherr, Sol, "Input Devices," p. 55, Mar. 1988.

Tran et al., "Universal Programmable Remote Control/Telephone," www.ip.com, 2 pages, May 1, 1992.

* cited by examiner

CROWN SENSING SYSTEM FOR AN ELECTRONIC WATCH

FIELD

The described embodiments relate generally to electronic devices, and more particularly, to a crown for a wearable electronic device.

BACKGROUND

Electronic devices frequently use physical input devices to facilitate user interaction. For example, buttons, keys, dials, and the like can be physically manipulated by users to control operations of the device. Physical input devices may use various types of sensing mechanisms to translate the physical manipulation to signals usable by the electronic device. For example, buttons and keys may use collapsible dome switches to detect presses, while dials and other rotating input devices may use encoders or resolvers to detect rotational movements.

SUMMARY

Embodiments are directed to an electronic watch that includes a housing defining a side wall, a display positioned at least partially in the housing and an input system. The input system can include a mounting bracket coupled to the housing, a crown coupled to the mounting bracket and configured to rotate and translate with respect to the housing and a flex plate coupled to the mounting bracket and configured to bend in response to translation of the crown. The input system can also include a strain sensing element coupled to the flex plate, and a processing system operably coupled to the strain sensing element and configured to detect the translation of the crown based at least in part on a signal from the strain sensing element.

Embodiments are also directed to a wearable electronic device that includes a housing having a side wall, a display coupled to the housing, a haptic system coupled to the housing and an input system. The input system can include a bracket assembly coupled to the housing, a crown positioned along the side wall and comprising a shaft assembly extending through the side wall, the crown coupled to the bracket assembly and the crown configured to rotate and translate with respect to the bracket assembly. The input system can include a flex plate coupled to the bracket assembly and configured to be deformed by the shaft assembly in response to translation of the crown and a strain sensing element coupled to the flex plate and configured to output a signal indicating a deformation of the flex plate.

Embodiments are further directed to an electronic watch that includes a housing, a display and an input system coupled to the housing. The input system can include a bracket assembly coupled to the housing, and a crown coupled to the bracket assembly and including a shaft assembly extending through the housing, the crown configured to rotate and translate with respect to the housing. The input system can include a flex plate coupled to the bracket assembly and configured to deform in response to translation of the crown and a strain sensing element coupled to the flex plate and configured to indicate a deformation of the flex plate. The electronic watch can also include a processing system operably coupled to the input system and configured to change a graphical output of the display in response to the deformation of the flex plate satisfying a threshold.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
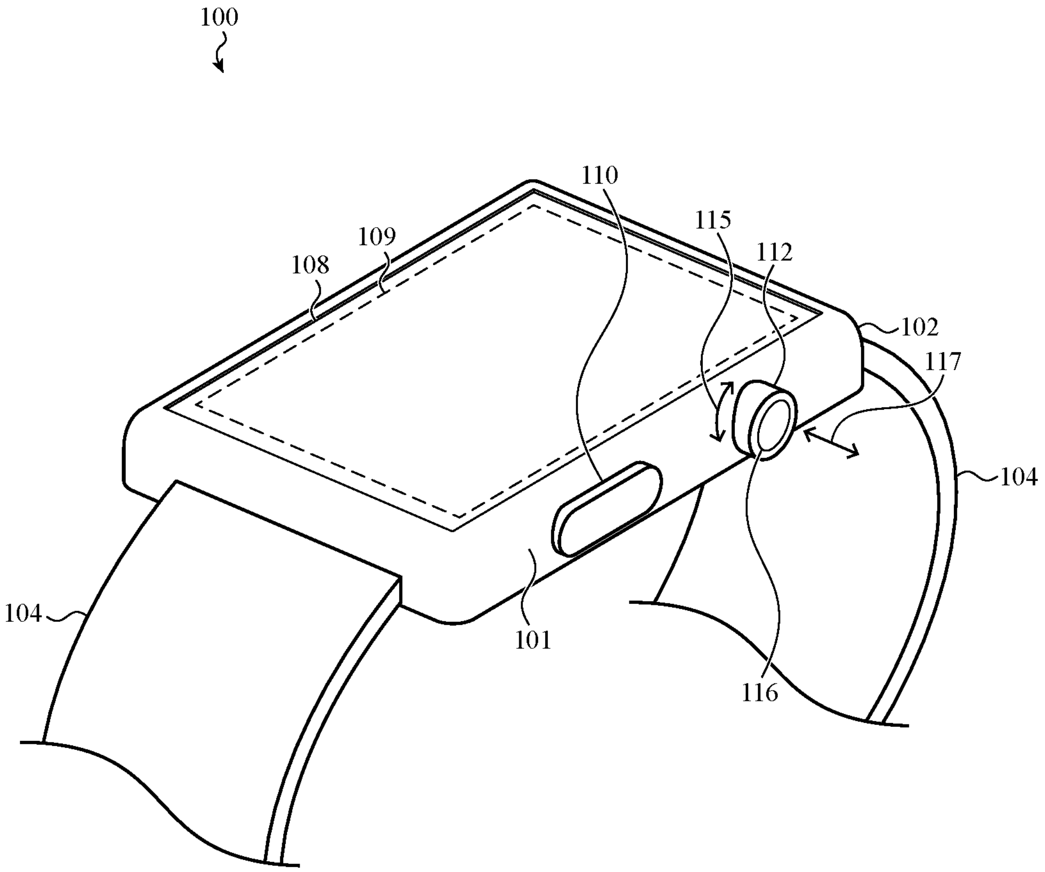
FIGS. 1A-1B depict an example wearable electronic device.

It should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments disclosed herein are directed to a crown of a wearable electronic device, such as an electronic watch (also referred to as a "smart watch" or simply a "watch"), and more particularly to a crown that can be manipulated by a user to provide inputs to the device. For example, the crown may accept rotational inputs, by which a user spins, twists, turns, or otherwise rotates the crown about a rotation axis. Rotational inputs may be used to control operations of the device. For example, a rotational input may modify a graphical display of the device in accordance with a direction of rotation of the crown, such as to scroll through lists, select or move graphical objects, move a cursor among objects on a display, or the like. The crown may also accept translational inputs, by which a user pushes or presses on the end of the crown (e.g., along, or parallel to, the rotation axis). Translational inputs may be used to indicate a selection of an item displayed on a display, change a display mode (e.g., to activate a display), change between or among graphical interface modes, or the like.

In some cases, a crown may also act as a contact point for a sensor, such as a biometric sensor, of the device. For example, a smart watch may include any or all of a heart rate sensor, an electrocardiogramansor, a thermometer, a photoplethysmograph sensor, a fingerprint sensor, or the like, all of which are examples of biometric sensors that measure or detect some aspect of a user's body (e.g., biometric information). Such sensors may require direct contact with the user's body, such as via a finger. Accordingly, the crown may include or define an external component, such as a window, electrode, or the like, that a user may touch in order to allow the biometric sensor to take a reading or measurement. In some cases, electrical signals may be transmitted through the crown to internal sensors via a conductive path defined by and/or through the crown.

In order to provide rotation and translation sensing, crowns may include various sensing systems, which may be positioned inside the watch. For example, an optical sensing system within a watch may detect rotational inputs, and a translation sensing system (e.g., a strain-gauge based sensing system, dome switch, etc.) or a force sensing system within the watch may detect translational or axial inputs. In electronic watches that provide many sophisticated electronic systems, such as wireless communications systems, touch-screen displays, GPS receivers, and the like, internal space is at a premium. Accordingly, reducing the space occupied by the crown sensing systems and other crown-based components can result in greater space for other components (including, for example, a larger battery to provide longer battery life). However, simply reducing the size of the crown components could reduce the overall crown performance (e.g., introduce wobbling and/or misalignment, poor rotation or translation detection, and so on).

The embodiments described herein include crowns that have compact designs while maintaining a high degree of performance. The crown may be part of an input system that includes a mounting bracket that couples the crown to a housing of a smart watch and allows the crown to rotate and translate with respect to the housing. In some cases, the input system may include a translation sensing system positioned on an end of the mounting bracket that detects translation of the crown toward (and/or away from) the housing and/or a force associated with translational or axial inputs. For example, the translation sensing system may detect when a user presses the crown toward the housing. To reduce how far the input system extends into the housing, the size of the translational sensing system may be reduced, which may allow more room for other components of the smart watch (e.g., a battery, processor, display, and so on).

The translation sensing system may operate by detecting deformation of a flex plate that occurs in response to a translation input, force input and/or other axial input to the crown. For example, the translation sensing system may include a flex plate that is coupled to the mounting bracket. As the crown is translated (e.g., pressed towards the housing) a shaft assembly of the crown may cause the flex plate to bend or otherwise experience a strain, and a translation sensing system, which includes a sensing element coupled to the flex plate, may detect the bend. The sensing system may output a signal that indicates an amount of deformation of the flex plate. For example, the sensing system may include a strain sensing element mounted to the flex plate that can be used to determine an amount of strain experienced by a corresponding portion of the flex plate and/or a force applied to the flex plate. In some cases, once the signal from the strain sensing element satisfies a threshold (e.g., indicating that the crown has translated a defined amount), the electronic device may register a crown press and perform one or more operations in response to the identified crown press. The actions may include providing a haptic feedback to the user to indicate that a press was registered and/or performing other functions such as changing a displayed graphic or any other suitable operation.

The combination of a flex plate and the strain and/or force sensing element may help reduce the amount that the input system extends into the housing. For example, the thickness of the translation sensing system may be proportional to the thickness of the flex plate and the sensing element (e.g., strain gauge). The flex plate can be configured as a thin beam that elastically deforms over the translation path of the crown. In some cases, the flex plate can include a metal beam that is coupled to the crown at one or more ends. However, in other cases, the flex plate can include any other suitable materials.

A rotation sensing system may also be coupled to the mounting bracket and may detect rotation of the crown with respect to the bracket (and the housing). The rotation sensing system may include an optical sensing unit that couples to a bottom and/or side portion of the crown. In these cases, the rotation sensing system may be coupled to the mounting bracket such that it does not increase the distance that the input sensing system extends into the housing.

These and other embodiments are discussed below with reference to FIGS. 1-6. However, those skilled in the art will readily appreciate that the detailed description given herein with respect to these Figures is for explanatory purposes only and should not be construed as limiting.

FIG. 1A depicts an electronic device 100 (also referred to herein simply as a device 100). The device 100 is depicted as a watch, though this is merely one example embodiment of an electronic device, and the concepts discussed herein may apply equally or by analogy to other electronic devices, including mobile phones (e.g., smartphones), tablet computers, notebook computers, head-mounted displays, headphones, earbuds, digital media players (e.g., mp3 players), or the like.

The device 100 includes a housing 102 and a band 104 coupled to the housing. The housing 102 may at least partially define an internal volume in which components of the device 100 may be positioned. The housing 102 may also define one or more exterior surfaces of the device, such as all or a portion of one or more side surfaces, a rear surface, a front surface, and the like. The housing 102 may be formed of any suitable material, such as metal (e.g., aluminum, steel, titanium, or the like), ceramic, polymer, glass, or the like. The band 104 may attach the device 100 to a user, such as to the user's arm or wrist. The device 100 may include battery charging components within the device 100, which may receive power, charge a battery of the device 100, and/or provide direct power to operate the device 100 regardless of the battery's state of charge (e.g., bypassing the battery of the device 100). The device 100 may include a magnet, such as a permanent magnet, that magnetically couples to a magnet (e.g., a permanent magnet, electromagnet) or magnetic material (e.g., a ferromagnetic material such as iron, steel, or the like) in a charging dock (e.g., to facilitate wireless charging of the device 100).

The device 100 also includes a transparent cover 108 coupled to the housing 102. The cover 108 may define a front face of the device 100. For example, in some cases, the cover 108 (e.g., a front cover) defines substantially the entire front face and/or front surface of the device. The cover 108 may also define an input surface of the device 100. For example, as described herein, the device 100 may include touch and/or force sensors that detect inputs applied to the cover 108. The cover may be formed from or include glass, sapphire, a polymer, a dielectric, or any other suitable material.

The cover 108 may overlie at least part of a display 109 that is positioned at least partially within the internal volume of the housing 102. The display 109 may define an output region in which graphical outputs are displayed. Graphical outputs may include graphical user interfaces, user interface elements (e.g., buttons, sliders, etc.), text, lists, photographs, videos, or the like. The display 109 may include a liquid crystal display (LCD), an organic light emitting diode display (OLED), or any other suitable components or display technologies.

The display 109 may include or be associated with touch sensors and/or force sensors that extend along the output region of the display and which may use any suitable sensing elements and/or sensing systems and/or techniques. Using touch sensors, the device 100 may detect touch inputs applied to the cover 108, including detecting locations of touch inputs, motions of touch inputs (e.g., the speed, direction, or other parameters of a gesture applied to the cover 108), or the like. Using force sensors, the device 100 may detect amounts or magnitudes of force associated with touch events applied to the cover 108. The touch and/or force sensors may detect various types of user inputs to control or modify the operation of the device, including taps, swipes, multi-finger inputs, single- or multi-finger touch gestures, presses, and the like. Touch and/or force sensors usable with wearable electronic devices, such as the device 100, are described herein with respect to FIG. 6.

The device 100 also includes an input system having a knob, external portion, or component(s) or feature(s) positioned along a side wall 101 of the housing 102. The input system may include a crown 112. At least a portion of the crown 112 (e.g., a knob) may protrude from and/or be generally external to the housing 102 and may define a generally circular shape or a circular exterior surface. The exterior surface of the crown 112 (or a portion thereof) may be textured, knurled, grooved, or may otherwise have features that may improve the tactile feel of the crown 112. At least a portion of the exterior surface of the crown 112 may also be conductively coupled to biometric sensing circuitry (or circuitry of another sensor that uses a conductive path to an exterior surface), as described herein.

The crown 112 may facilitate a variety of potential user interactions. For example, the crown 112 may be rotated by a user (e.g., the crown may receive rotational inputs). The arrow 115 in FIG. 1A illustrates example direction(s) of rotational inputs to the crown 112. Rotational inputs to the crown 112 may zoom, scroll, rotate, or otherwise manipulate a user interface or other object displayed on the display 109 (among other possible functions). The crown 112 may also be translated or pressed (e.g., axially) by the user, as indicated by arrow 117. Translational or axial inputs may select highlighted objects or icons, cause a user interface to return to a previous menu or display, or activate or deactivate functions (among other possible functions).

As described herein, rotational inputs may be sensed using an optical sensing system that uses light reflected by a rotating surface of the crown 112 to determine characteristics (e.g., the speed and/or direction) of the rotational inputs. For example, light may be directed onto a rotating surface of the crown 112, and at least a portion of that light may be reflected by the rotating surface and detected by the sensing system. The sensing system may use the reflected light to determine characteristics of the rotational inputs. In some cases, the sensing system may use self-mixing laser interferometry to determine characteristics of the rotational inputs. In such cases, interference (or other interaction) between a laser beam that is directed onto a rotating surface and the laser light that is reflected from the rotating surface back into the laser source may be used to determine the characteristics.

Other types of optical sensing systems may be used instead of or in addition to self-mixing laser interferometry. For example, an image sensor may be used to detect characteristics of the rotational inputs by analyzing images of the rotating surface. As another example, an optical sensing system may include a light emitter that emits light onto a rotating surface (which may have markings, grooves, features, patterns, etc.), and a light detector that detects a portion of the emitted light that is reflected by the rotating surface. The detector may determine parameters or characteristics of the rotation (e.g., speed and direction) based on properties or parameters of the reflected light.

Translation and/or axial inputs may be sensed using a translation sensing system that uses a strain sensing element and/or force sensing element to measure deformation (e.g., bending) of a flex plate or beam. The amount of strain and/or force detected by the translation sensing system can be used to determine when the crown receives a translation or axial input. In some cases, the translation sensing system may determine that an axial input has been received at the crown (e.g., press input) in response to a strain sensing element indicating that the crown has translated a threshold distance. In other cases, the translation sensing system may determine that an axial input has been received at the crown (e.g., press input) in response to a force sensing element indicating that a threshold force has been applied to the crown.

The crown 112 may also include or define an input feature 116 that facilitates input to biometric sensing circuitry or other sensing circuitry within the device 100. The input feature 116 may be a conductive surface that is conductively coupled, via one or more components of the device 100, to the biometric sensing circuitry. The input feature 116 may be a conductive member (e.g., a cap or disk) that is part of the crown 112. In some cases, the input feature 116 and/or the component(s) that define the input feature 116 are electrically isolated from other components of the device 100. For example, the input feature 116 may be electrically isolated from the housing 102. In this way, the conductive path from the input feature 116 to the biometric sensing circuitry may be isolated from other components that may otherwise reduce the effectiveness of the biometric sensor.

In order to provide an input to the biometric sensor, a user may place a finger or other body part on the input feature 116. The biometric sensor may be configured to take a reading or measurement in response to detecting that the user has placed a finger or other body part on the input feature 116. In some cases, the biometric sensor may only take a reading or measurement when a sensing function is separately initiated by a user (e.g., by activating the function via a graphical user interface). In other cases, a reading or measurement is taken any time the user contacts the input feature 116 (e.g., to provide a rotational or translational input to the crown 112). The user may have full control over when the biometric sensor takes measurements or readings and may even have the option to turn off the biometric sensing functionality entirely.

The device 100 may also include one or more haptic actuators that are configured to produce a tactile output through the crown 112 or otherwise detectable when using the crown 112. For example, the haptic actuator may be coupled to the crown 112 and may be configured to impart a force to the crown 112. The force may cause the crown 112 to move (e.g., to oscillate or vibrate translationally and/or rotationally, or to otherwise move to produce a tactile output), which may be detectable by a user when the user is contacting the crown 112. The haptic actuator may produce tactile output by moving the crown 112 in any suitable way.

For example, the crown 112 (or a component thereof) may be rotated (e.g., rotated in a single direction, rotationally oscillated, or the like), translated (e.g., moved along a single axis), or pivoted (e.g., rocked about a pivot point).

In other cases, the haptic actuator may produce tactile outputs using other techniques, such as by imparting a force to the housing 102 (e.g., to produce an oscillation, vibration, impulse, or other motion), which may be perceptible to a user through the crown 112 and/or through other surfaces of the device 100, such as the cover 108, the housing 102, or the like. Any suitable type of haptic actuator and/or technique for producing tactile output may be used to produce these or other types of tactile outputs, including electrostatics, piezoelectric actuators, oscillating or rotating masses, ultrasonic actuators, reluctance force actuators, voice coil motors, Lorentz force actuators, or the like. In some cases, haptic outputs from a haptic actuator may be used to provide tactile outputs when a crown that does not otherwise include a tactile element (e.g., a tactile switch) is actuated. For example, when a translational or axial force is applied to a crown that does not include a tactile switch (or other mechanical tactile component), a haptic actuator may produce a haptic output when the crown is actuated. The device may determine that the crown is actuated when a translation or force satisfying a certain criteria is detected (e.g., when a non-tactile switch element is collapsed or otherwise actuated, when a force sensor detects a force above a threshold value, or the like).

Tactile outputs may be used for various purposes. For example, tactile outputs may be produced when a user presses the crown 112 (e.g., applies an axial force to the crown 112) to indicate that the device 100 has registered the press as an input to the device 100. As another example, tactile outputs may be used to provide feedback when the device 100 detects a rotation of the crown 112 or a gesture being applied to the crown 112. For example, a tactile output may produce a repetitive “click” sensation as the user rotates the crown 112 or applies a gesture to the crown 112. Tactile outputs may be used for other purposes as well.

The device 100 may also include other inputs, switches, buttons, or the like. For example, the device 100 includes a button 110. The button 110 may be a movable button (as depicted) or a touch-sensitive region of the housing 102. The button 110 may control various aspects of the device 100. For example, the button 110 may be used to select icons, items, or other objects displayed on the display 109, to activate or deactivate functions (e.g., to silence an alarm or alert), or the like.

Figure 1B:
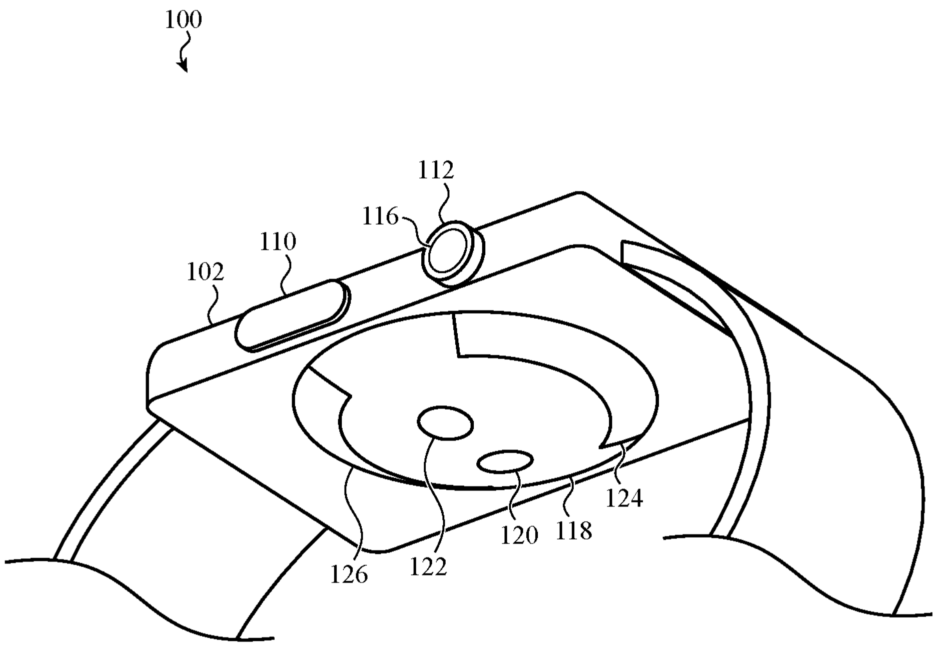

FIG. 1B shows a rear side of the device 100. The device 100 includes a rear cover 118 coupled to the housing 102 and defining at least a portion of the rear exterior surface of the device 100. The rear cover 118 may be formed of or include any suitable material(s), such as sapphire, polymer, ceramic, glass, or any other suitable material.

The rear cover 118 may define a plurality of windows to allow light to pass through the rear cover 118 to and from sensor components within the device 100. For example, the rear cover 118 may define an emitter window 120 and a receiver window 122. While only one each of the emitter and receiver windows are shown, more emitter and/or receiver windows may be included (with corresponding additional emitters and/or receivers within the device 100). The emitter and/or receiver windows 120, 122 may be defined by the material of the rear cover 118 (e.g., they may be light-transmissive portions of the material of the rear cover 118), or they may be separate components that are positioned in holes formed in the rear cover 118. The emitter and receiver windows, and associated internal sensor components, may be used to determine biometric information of a user, such as heart rate, blood oxygen concentrations, and the like, as well as information such as a distance from the device to an object. The particular arrangement of windows in the rear cover 118 shown in FIG. 1B is one example arrangement, and other window arrangements (including different numbers, sizes, shapes, and/or positions of the windows) are also contemplated. As described herein, the window arrangement may be defined by or otherwise correspond to the arrangement of components in the integrated sensor package.

The rear cover 118 may also include one or more electrodes 124, 126. The electrodes 124, 126 may facilitate input to biometric sensing circuitry or other sensing circuitry within the device 100 (optionally in conjunction with the input feature 116). The electrodes 124, 126 may be a conductive surface that is conductively coupled, via one or more components of the device 100, to the biometric sensing circuitry.

Figure 2:
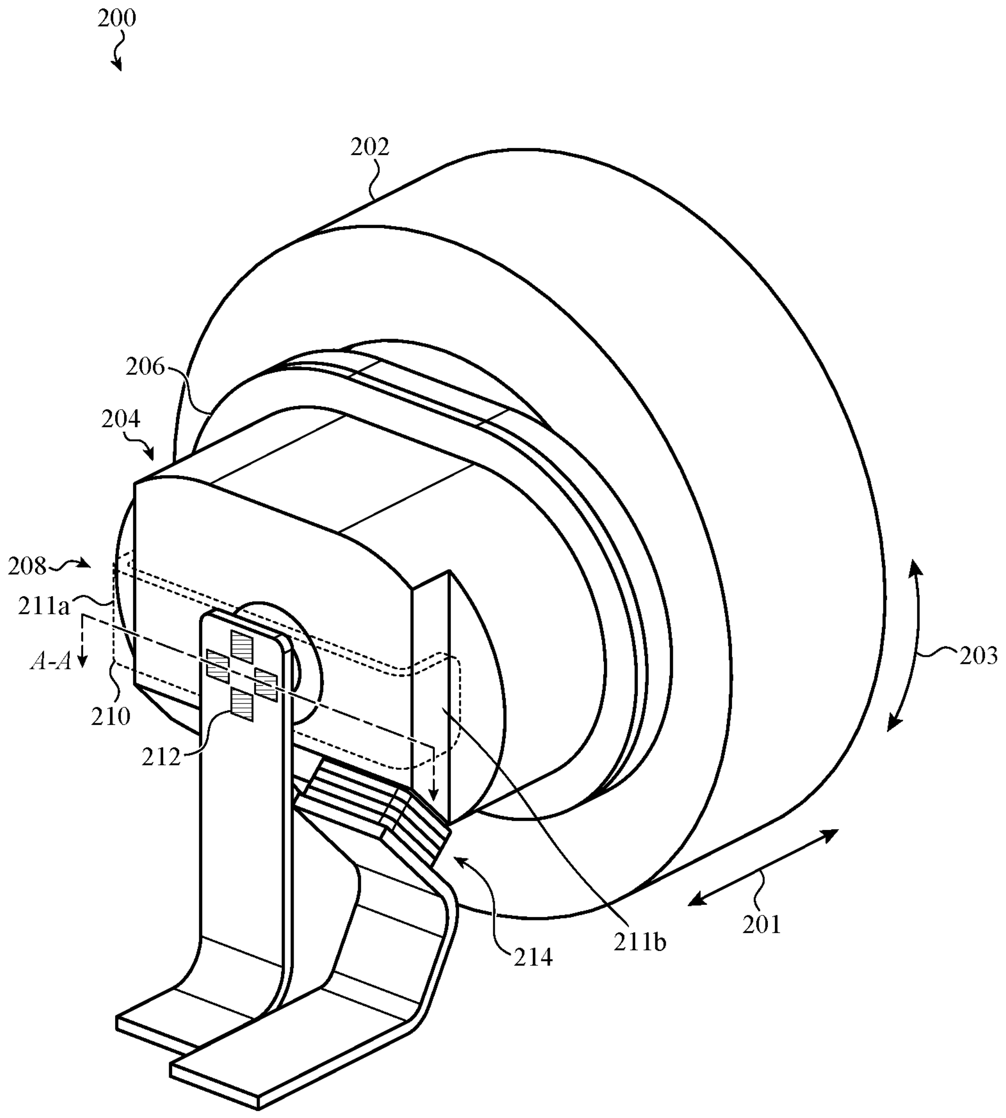
FIG. 2 depicts a perspective view of an example input system.

FIG. 2 depicts a perspective view of an example input system 200. The input system 200 can include a crown 202, which can be an example of the crowns described herein including the crown 112. The input system 200 can also include a mounting bracket 204, a translational sensing system 208 and a rotational sensing system 214.

The mounting bracket 204 may be coupled to a housing of an electronic device (e.g., housing 102). The crown 202, the translational sensing system 208 and the rotational sensing system 214 may be coupled to the mounting bracket 204. The crown 202 may be coupled to the mounting bracket 204 such that the crown 202 can translate (e.g., along direction 201) and rotate (e.g., along path 203) with respect to the mounting bracket 204.

The mounting bracket 204 can couple to the housing in a variety of ways. The mounting bracket 204 can include a flange 206 (or other suitable feature) that contacts an outer portion of the housing and defines how the input assembly is positioned with respect to the housing. In some cases, the mounting bracket 204 can include a seal and/or adhesive (e.g., pressure sensitive adhesive) that is coupled to the flange 206 and seals the mounting bracket to the housing. Additionally or alternatively, the mounting bracket 204 may be secured to the housing using a twist lock or threaded component (not shown) that is positioned inside the housing and captures a wall of the housing between the flange 206 and the twist lock component to statically couple the mounting bracket 204 to the housing. In some cases, the mounting bracket 204 can be welded (e.g., laser welded) or otherwise secured to the housing to statically couple the mounting bracket to the housing.

Components of the translational sensing system 208 may be coupled to the mounting bracket 204 and include a flex plate 210 and one or more sensing elements 212 coupled to the flex plate 210. In some cases, the flex plate 210 may be a beam that extends at least partially across an end of the mounting bracket 204. As the crown is translated along movement path 201 and toward the mounting bracket 204, a shaft assembly that is part of the crown 202 may contact the flex plate 210 and cause the flex plate 210 to bend. The one or more sensing elements 212 may be operated to determine an amount that the flex plate 210 deforms (e.g., bends) and/or a force applied to the flex plate (and crown 202).

The electronic device may include a processing system that receives a signal from the sensing element(s) 212 and analyzes the signal to determine whether to register a crown press. For example, the processing system may be configured to register a crown press in response to the signal satisfying a threshold (e.g., indicating a translation of the crown 202 satisfies a deformation threshold and/or force applied to the crown satisfies a force threshold). In these cases, translational movement of the crown 202 and/or a force applied to the crown that results in the sensor element 212 signal not satisfying a threshold is not registered as a crown press and translational movement of the crown 202 that results in the senor element 212 signal satisfying the threshold is registered as a crown press. The threshold(s) can be configured so that the crown 202 translates a defined distance and/or a defined force is applied to the crown 202 in order to register a crown press.

As described herein, output signals from the sensing system 208 can be received by a processing system. In some cases the processing system can be configured to perform one or more operations in response to registering a crown press. For example, the processing system may cause a haptic system to provide a haptic output at the crown 202 and/or other portions of the electronic device. Additionally or alternatively, the processing system may cause a graphical output of a display to be changed or otherwise updated as described herein.

In some cases, the flex plate 210 has only a first end 211*a* coupled to the mounting bracket 204, resulting in the flex plate 210 having a cantilevered bending profile. In other cases, the flex plate 210 has a first end 211*a* and a second end 211*b* coupled to the mounting bracket 204, as shown in FIG. 2, and the flex plate 210 may bend between the first and second ends. In other cases, the flex plate 210 can have different shapes, which may include features for mounting other components such as electronic flex strips which couple to the sensor element 212 and/or other components of the input system 200. The flex plate 210 can be attached to the mounting bracket 204 in a variety of ways including being welded, being adhered, using fasteners, being insert molded with the bracket, and/or using any other suitable technique.

One or more sensing elements 212 can be coupled to the flex plate 210 in any suitable location. In some cases, a strain sensing element 212 can be coupled to a portion of the flex plate 210 that will experience a higher strain during bending (as compared to other locations of the flex plate 210). For example, if the flex plate 210 has a beam configuration and is coupled to the mounting bracket 204 at each end, a strain sensing element 212 may be coupled substantially mid-way between the two ends, which corresponds to a position in which the flex plate 210 is expected to experience the greatest deformation. In other cases, the sensing elements 212 can be positioned in any other suitable location. For example, the crown 202 (e.g., shaft assembly) may contact a first side of the flex plate 210 and the sensing element 212 can be coupled to an opposite side of the flex plate 210.

In some cases, the strain sensing elements 212 can include strain gauges that are coupled to the flex plate 210. One or more strain gauges can be coupled to the flex plate 210 to measure strain in one or more directions. In some cases, the strain gauges may be integrated with an electronic flex strip, which may carry electrical signals to and from the strain gauges. The strain gauges can include any suitable configuration of strain gauges including a single strain gauge, half-bridge configurations, full-bridge configurations, Wheatstone bridges and/or the like. Additionally or alternatively, the sensing elements 212 can include force sensing elements that are operated to determine a force applied to the flex plate 210 and/or the crown 202.

The flex plate 210 can be formed from any suitable material including metals (e.g., metal alloys), ceramic materials, polymer materials, and/or the like. For example, the flex plate 210 may include stainless steel, aluminum alloys, titanium, carbon fiber, and so on. The flex plate can be one monolithic piece or a composite structure (e.g., layered structure). The flex plate 210 can also have a uniform thickness or different thicknesses at different locations which may isolate or increase a strain at a particular location.

In some cases, the processing system may determine an amount of deformation and/or a force of a translational or axial input. For example, the processing system can be configured with strain calibration parameters which relate output voltages of the sensing elements to an amount of translation movement. In some cases, the processing system can be configured with force calibration parameters which relate output voltages and/or strain to an amount of force of the translation input.

The rotational sensing system 214 can be coupled to the mounting bracket 204 and sense rotation of the crown 202 about an axis of rotation of the crown 202 (e.g., along path 203). In some cases, the mounting bracket 204 can include an opening and the rotational sensing system 214 can be positioned at least partially within the opening. The rotational sensing system 214 can include one or more optical components (e.g., an optical encoder) that are configured to detect rotation of the crown as described herein. In some cases, the rotational sensing system 214 can be positioned along a side, for example, angled along the bottom side of the mounting bracket 204 as shown in FIG. 2. This may position the optical sensing system 214 so that is does not increase the distance that the input system 200 extends into the housing.

Figure 3:
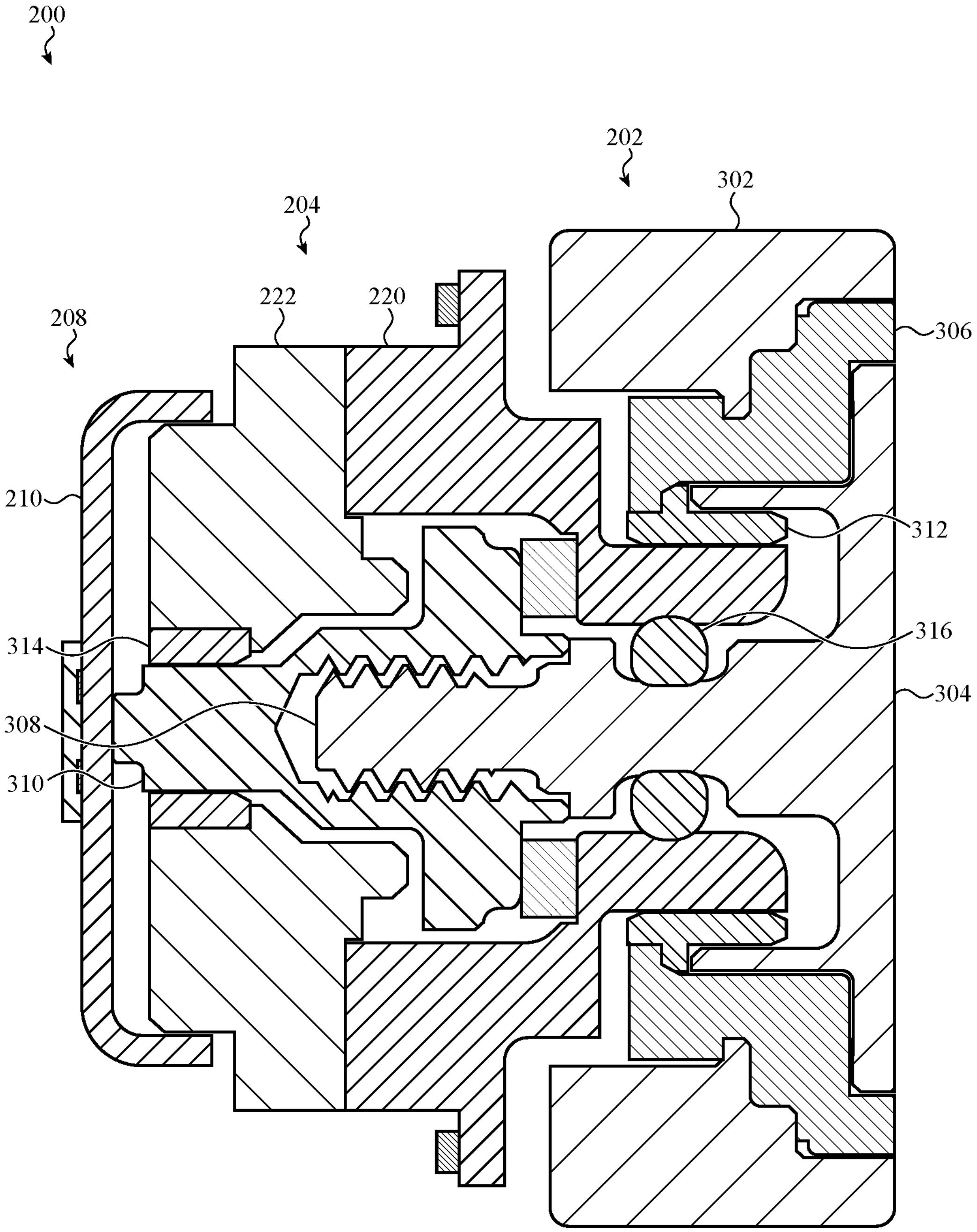
FIG. 3 depicts a partial cross-sectional view of the input system shown in FIG. 2.

FIG. 3 depicts a partial cross-sectional view of the input system 200 taken along line A-A. The crown 202 can include multiple components including a knob 302, a shaft assembly including an input component 304 and an inner shaft 310, and a coupling member 306. The coupling member 306 may couple the knob 302 to the input component 304. In some cases, the coupling member 306 may electrically isolate the knob from the input component 304, which may allow the input component 304 to be operated as a sensor to measure biometric parameters of a user as described herein. In other cases, the knob 302 and the input component 304 can be electrically coupled, which may allow the knob 302 and/or the input component 304 to be operated as a sensor for measuring biometric parameters.

The knob 302 and at least a portion of the input component 304 can be positioned outside the housing of a smart watch as described herein. The input component 304 may define (or be coupled to) an intermediate shaft 308 that extends into the mounting bracket 204 and the housing. In some cases, the intermediate shaft 308 can be coupled to the inner shaft 310, for example using a threaded connection or any other suitable connection. The crown 202 may be supported by one or more rotational supports including a first rotational support 312 and a second rotational support 314. The rotational supports can be any suitable components that allow for rotation and/or translation of the crown 202. In some cases, the first rotational support 312 and/or the second rotational support 314 can include bushings, bearings, and/or other suitable structures.

Additionally or alternatively, the input system 200 can include a sealing support 316, which may seal an outer portion of the crown 202 from an inner portion of the mounting bracket 204 and/or an inner portion of the housing. In some cases, the sealing support 316 may include an O-ring or other suitable structure. The sealing support 316 may provide additional rotational and/or translational support to the crown 202 (e.g., in addition to or as an alternative to the rotational supports 312, 314). The sealing support 316 may be configured to prevent the ingress of water, air, contaminants or other substances into the mounting bracket 204 and housing of the smart watch.

The shaft assembly can include the input component 304, the intermediate shaft 308 and the inner shaft 310. An end of the shaft assembly may contact or be coupled to the flex plate 210. As the crown 202 is translated toward the mounting bracket 204 (and housing), the shaft assembly also translates, ultimately causing the flex plate 210 to bend. The sensing element(s) 212 may output a signal that indicates an amount of deformation (e.g., bending) of the flex plate 210.

The translational motion and/or rotational motion of the crown 202 may be defined by the structures that couple the crown 202 to the mounting bracket 204 or otherwise support the crown 202 relative to the mounting bracket 204. The mounting bracket 204 may define one or more features that define a movement path of the crown 202 and/or limit movement of the crown 202. For example, in response to a user pressing the crown 202 towards the housing, the first rotational support 312 may slide (or otherwise move) along the mounting bracket 204 and the inner shaft 310 may slide along the second rotational support 314. The shaft assembly (e.g., input component 304) may move with respect to the sealing support 316 and/or the sealing support 316 may move along the mounting bracket 204.

Motion of the crown 202 toward the mounting bracket 204 can be limited by one or more components of the input assembly. For example, the motion of the crown 202 toward the mounting bracket 204 may be limited by contact of the inner shaft 310 with the mounting bracket 204. Motion of the crown 202 away from the mounting bracket 204 can also be limited by one or more components of the input assembly. For example, motion of the crown 202 away from the mounting bracket 204 may also be limited by contact of the inner shaft 310 with the mounting bracket 204. The range of translational movement of the crown 202 and the flex plate 210 may be configured so that the flex plate 210 remains within an elastic deformation state. For example, the material, thickness, length, mounting locations or other parameters of the flex plate 210 may be configured so that the flex plate 210 remains in an elastic deformation state throughout the range of translational movement of the crown 202.

The range of motion of the crown 202 (e.g., distance of translation) can be defined such that a user can feel the crown translate toward and/or away from the watch. In some cases, the translation distance can be between 0.1 millimeters and 1 millimeter. In other cases, the crown 202 may move less than 0.1 millimeters and the sensing system may include a force sensor that is operated to determine a force on the crown 202. In these cases, the crown 202 may operate as a solid-state object and a crown press may be determined based on whether a force applied to the crown 202 satisfies a force threshold.

In some cases, the flex plate 210 can bias the crown 202 to a default position. For example, the flex plate 210 may have a neutral position and deformation away from the neutral position may cause the flex plate 210 to exert a spring force on the crown 202 (e.g., through inner shaft 310). The neutral position or resting position of the flex plate 210 may correspond to the crown 202 being offset from the mounting bracket 204. Movement of the crown 202 toward the mounting bracket 204 may cause the flex plate 210 to deform resulting in the flex plate 210 generating an opposing force on the crown 202. Accordingly, when the force causing the crown 202 to move toward the mounting bracket 204 is removed (e.g., user removes their finger from the crown 202), the flex plate 210 may cause the crown 202 to move away from the mounting bracket 204 and housing.

In some cases, the shaft assembly of the crown 202 may be coupled to the flex plate 210. For example, the flex plate 210 may define an opening and the shaft assembly (e.g., inner shaft 310) may extend through the opening. The shaft assembly may be press-fit or otherwise attached to the flex plate 210 (e.g., the inner shaft 310 may include a recess that captures the sides of the opening, the inner shaft 310 may be adhered to the flex plate 210, and so on).

In some cases, the mounting bracket 204 may include multiple components including a first housing bracket 220 and a second housing bracket 222. In some cases, the crown 202 (or a portion thereof) may be assembled to one or more of the brackets and the first and second housing brackets 220, 222 can be coupled together. In some cases, an internal portion of the mounting bracket 204 may be sealed to protect the inner components, such as the intermediate shaft 308, encoder components and/or other components from contamination.

Figure 4A:
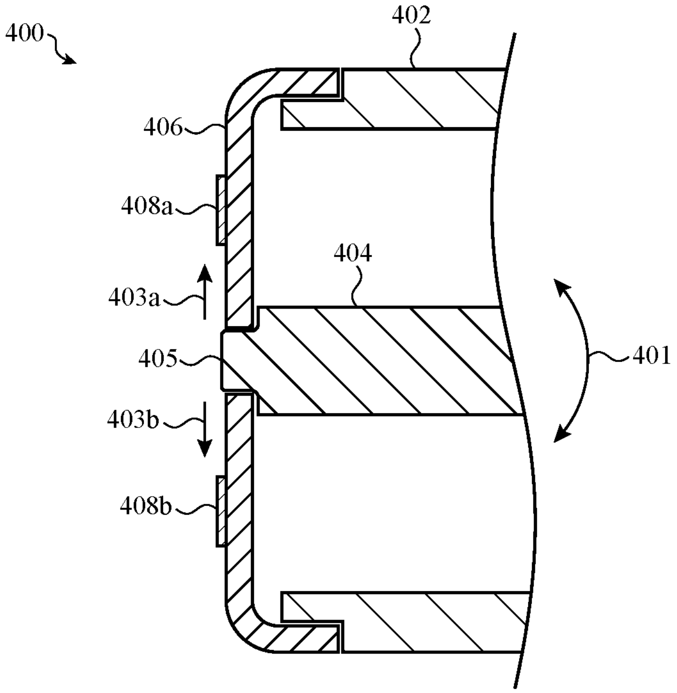
FIGS. 4A-4B depict partial cross-sectional views of example input assemblies.
Figure 4B:
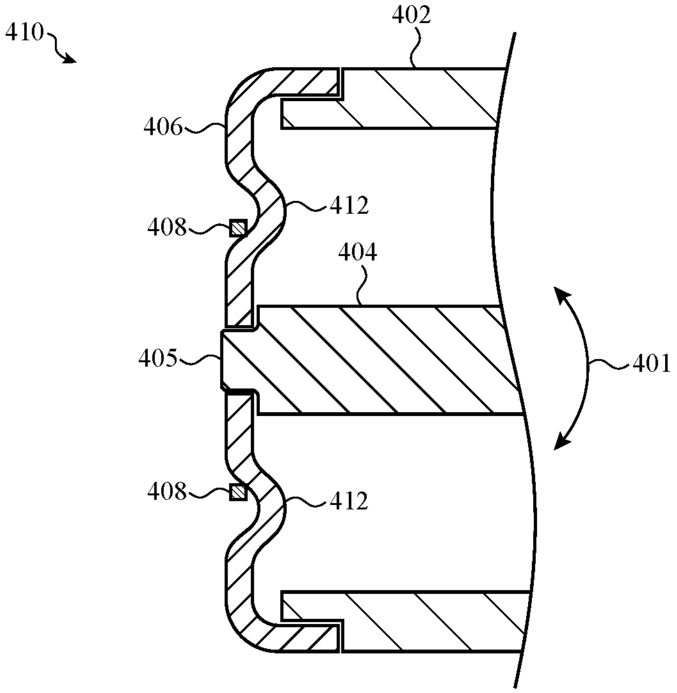

FIGS. 4A-4B depict partial cross-sectional views of example input assemblies. The partial cross-sectional views shown in FIGS. 4A-4B may be an example of the components of the input assemblies described herein (e.g., input system 200). FIGS. 4A-4B depict examples of input assemblies that may be used to detect motion of a crown in different directions. In some cases, a crown may be configured to move in other directions in addition to the rotation and translation as described herein. For example, the crown may be configured such that it can pivot with respect to the rotational axis, which may allow the crown to function similar to a joystick. The input assemblies shown in FIGS. 4A-4B may be configured to detect motion of the crown in one or more directions in addition to rotation and translation as described herein.

FIG. 4A shows an example of a first input assembly 400 that can detect multi-directional motion of the crown. The first input assembly 400 can be an example of the input assemblies described herein (e.g., input system 200) and include a mounting bracket 402, a shaft assembly 404, a flex plate 406 and one or more sensor elements 408.

The crown may be configured to move in one or more directions which can cause the shaft assembly 404 to pivot in one or more directions, including pivoting motion 401. In some cases, the shaft assembly 404 can include a coupling feature 405 which engages with the flex plate 406 to transfer motion of the shaft assembly 404 to the flex plate 406. For example, the coupling feature 405 may be positioned within an opening defined by the flex plate 406. However, in other embodiments, the shaft assembly 404 may be coupled to the flex plate 406 in any suitable way that causes the flex plate 406 to move with the shaft assembly 404. For example, movement of the shaft assembly 404 along pivoting motion 401 may cause the flex plate 406 to move along path 403.

One or more sensing elements 408 may be coupled to the flex plate 406 to determine a direction of motion of the flex plate 406. The sensing elements 408 may be examples of the sensing elements described herein. In some cases, the sensing elements may be strain gauges configured to measure strain along a specific direction of the flex plate 406. The outputs from the one or more sensing elements 408 may be used to determine a direction of motion of the crown. For example, if the movement of the crown causes the shaft assembly 404 to move the flex plate 406 in a first direction 403*a*, the portion of the flex plate 406 under a first sensing element 408*a* may be compressed, and the first sensing element 408*a* may indicate that the flex plate 406 is being compressed at this location and/or indicate an amount of the compression. If the movement of the crown causes the shaft assembly 404 to move the flex plate 406 in a second direction 403*b*, the portion of the flex plate 406 under the first sensing element 408*a* may be elongated, and the first sensing element 408*a* may indicate that the flex plate is being elongated in this location and/or indicate an amount of the elongation. Accordingly, the processing system may determine a direction of movement of the crown based on the output from the first sensing element 408*a*.

In some cases, multiple sensing elements 408 may be used to determine characteristics or parameters of a motion of or force applied to the crown. For example, if the flex plate 406 moves in the first direction 403*a*, the first sensing element may indicate compression and the second sensing element 408*b* may indicate compression, and the combination of the outputs from both sensing elements 408 may be used to determine the direction of motion. In other cases, the sensing elements may be oriented in different directions and the combination of the location, orientation and outputs from the multiple sensing elements may be used to determine a direction of motion of the crown. The locations and/or orientations of the sensing elements may be selected based on how the flex plate 406 will deflect/deform for specific types of inputs or directions of inputs. For example, sensing elements 408 may be positioned at bends of the flex plate 406 to detect pivot inputs and other sensing elements 408 may be positioned at a middle of the flex plate 406 to detect axial inputs.

FIG. 4B shows an example of a second input assembly 410 that can detect motion of the crown. The second input assembly 410 can be an example of the input assemblies described herein (e.g., input system 200) and include the mounting bracket 402, the shaft assembly 404, the flex plate 406 and one or more sensing elements 408, In some cases, the flex plate 406 can include one or more features that increase a sensing element output and/or indicate a direction of motion of the flex plate 406 which can be used to determine a movement direction of the crown. For example, the flex plate 406 can define or otherwise include one or more strain features 412. In some cases, the strain features 412 may be a curved segment of the flex plate 406, and one or more sensing elements 408 can be coupled to the flex plate 406 at the strain features 412. As the crown is moved (e.g., translated and/or pivoted) the shaft assembly 404 may deform the flex plate 406. The strain features 412 may experience greater amounts of localized strain, which may increase an output of the sensing elements 408 (and may also facilitate a greater motion of the crown in response to a given input force, as compared to a flex plate without the strain features). The strain features 412 may be configured in any arrangement to determine an amount of deflection of the flex plate 406, force of the input to the crown, direction of input or a combination thereof.

Figure 5:
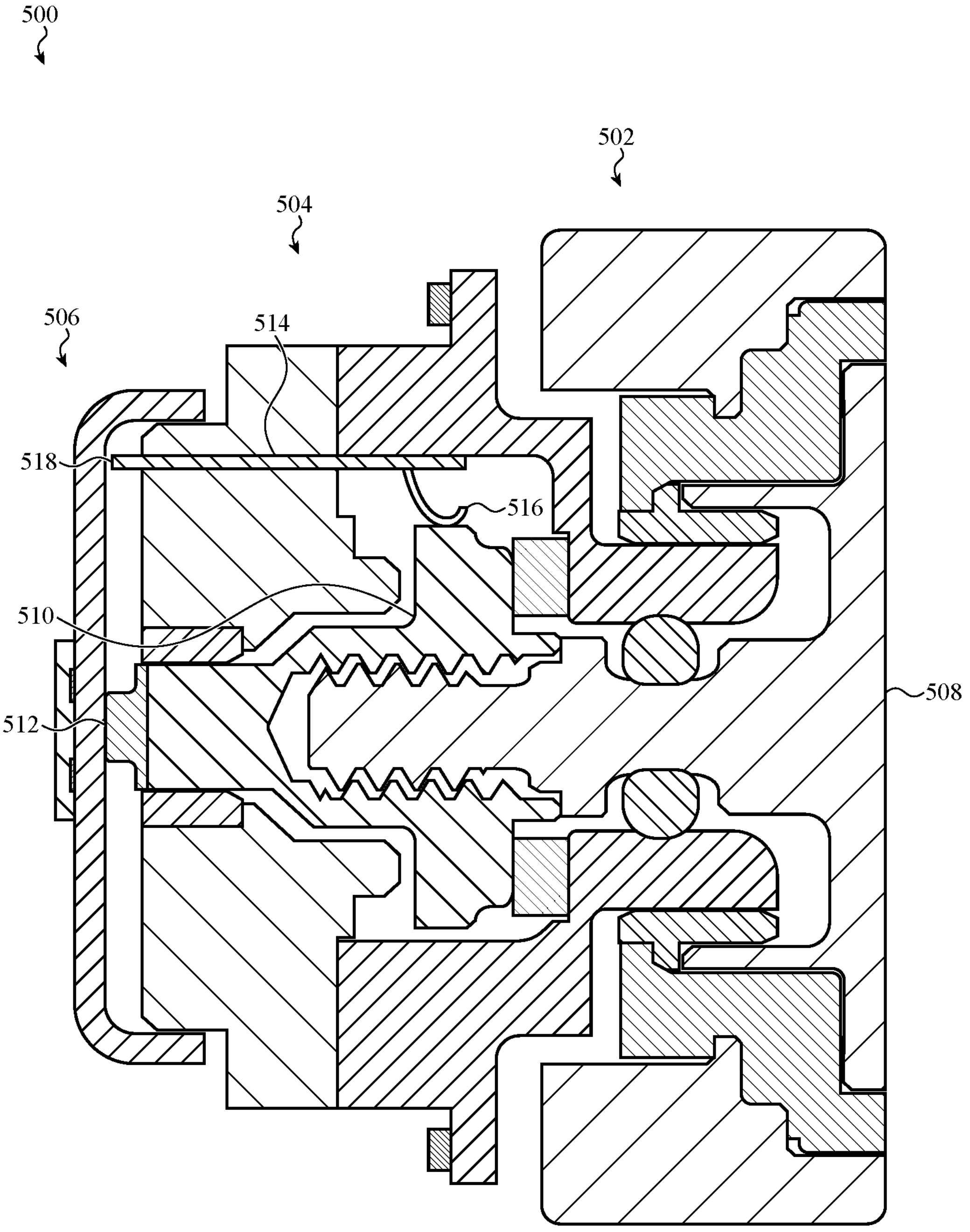
FIG. 5 depicts a partial cross-sectional view of a device with an example crown.

FIG. 5 depicts a partial cross-sectional view of an example input system 500 as described herein. The input system 500 may be an example of the input systems described herein and may include a crown 502, a mounting bracket 504, and a translation sensing system. The input system may include a biometric sensing system that is configured to measure physiological parameters of a user using the crown 502.

The crown 502 can include an input feature 508, which may be an example of the input features described herein (e.g., input feature 116) and which may be a conductive surface that is conductively coupled, via one or more components of the device, to the biometric sensing circuitry within the device. The input feature 508 and an inner shaft 510 (and/or other portions of the shaft assembly) may be electrically conductive. Additionally, the input system 500 can include a conductive member 514 and contact member 516 that are each electrically conductive. The contact member 516 may be a metallic spring element that maintains contact with the inner shaft 510 during rotation, translation, pivot inputs, or other manipulations of the crown. The electrically conductive member 514 may include or be coupled to the output feature 518, which may couple to an electronic flex circuit that ultimately operatively couples the input feature 508 to biometric sensing circuitry or other components within the device. Thus, the input feature 508, the inner shaft 510, the contact member 516, the conductive member 514 and the output feature 518 may define at least part of a conductive path between the input feature 508 and the biometric sensing circuitry. Moreover, the conductive path through the crown may be electronically isolated from other components of the input system 500.

In some cases, the crown may include a flex contact member 512 that contacts the flex plate 506 and electrically isolates that inner shaft 510 (and input feature 508) from the flex plate 506 (e.g., in cases where the flex plate includes a conductive material such as metal). Additionally or alternatively, the flex plate 506 may be formed or include an electrically isolating material, such as a polymer or ceramic, that electrically isolates the flex plate from conductive portions of the crown 502 (e.g., the inner shaft 510).

Figure 6:
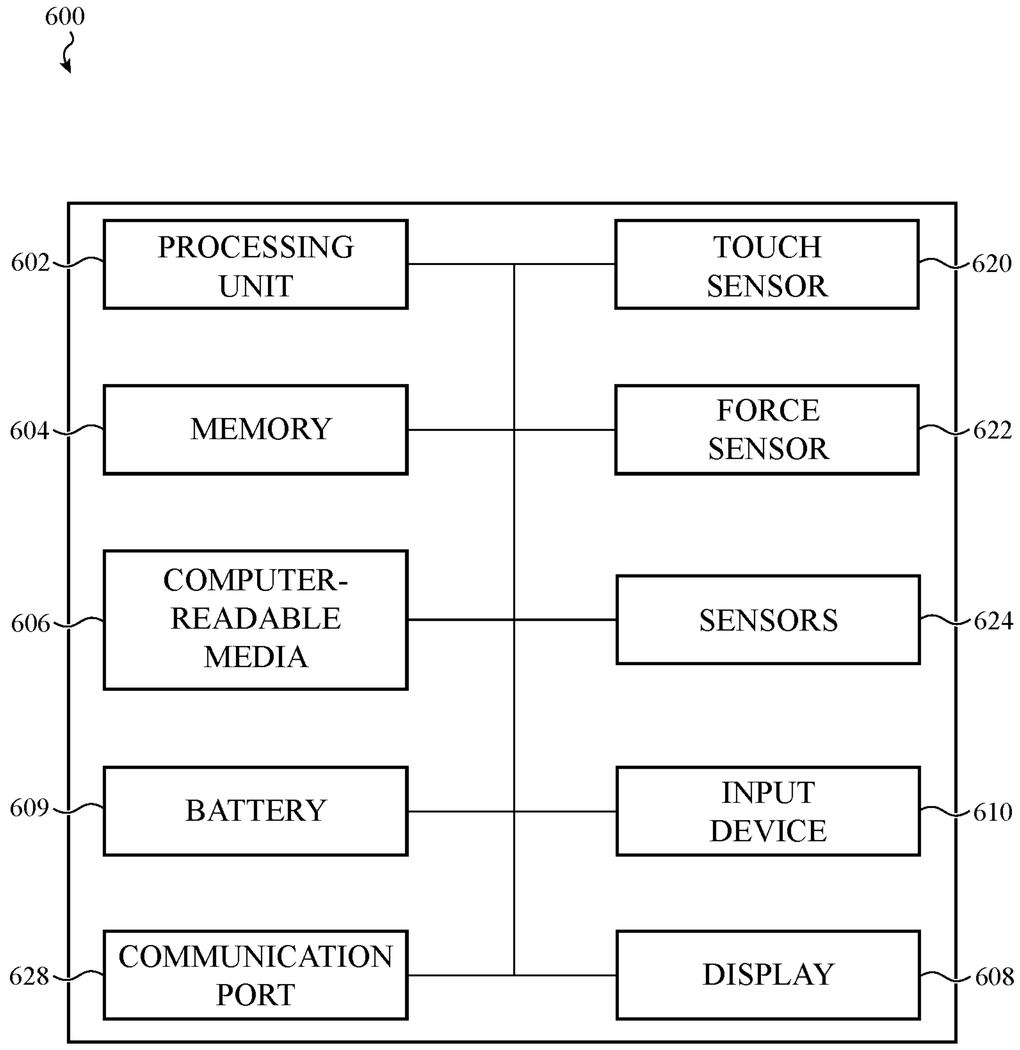
FIG. 6 depicts example components of an electronic device.

FIG. 6 depicts an example schematic diagram of an electronic device 600. By way of example, the device 600 of FIG. 6 may correspond to the wearable electronic device 100 shown in FIGS. 1A-1B (or any other wearable electronic device described herein). To the extent that multiple functionalities, operations, and structures are disclosed as being part of, incorporated into, or performed by the device 600, it should be understood that various embodiments may omit any or all such described functionalities, operations, and structures. Thus, different embodiments of the device 600 may have some, none, or all of the various capabilities, apparatuses, physical features, modes, and operating parameters discussed herein.

As shown in FIG. 6, a device 600 includes a processing unit 602 operatively connected to computer memory 604 and/or computer-readable media 606. The processing unit 602 may be operatively connected to the memory 604 and computer-readable media 606 components via an electronic bus or bridge. The processing unit 602 may include one or more computer processors or microcontrollers that are configured to perform operations in response to computer-readable instructions. The processing unit 602 may include the central processing unit (CPU) of the device. Additionally or alternatively, the processing unit 602 may include other processors within the device including application specific integrated chips (ASIC) and other microcontroller devices.

The memory 604 may include a variety of types of non-transitory computer-readable storage media, including, for example, read access memory (RAM), read-only memory (ROM), erasable programmable memory (e.g., EPROM and EEPROM), or flash memory. The memory 604 is configured to store computer-readable instructions, sensor values, and other persistent software elements. Computer-readable media 606 also includes a variety of types of non-transitory computer-readable storage media including, for example, a hard-drive storage device, a solid-state storage device, a portable magnetic storage device, or other similar device. The computer-readable media 606 may also be configured to store computer-readable instructions, sensor values, and other persistent software elements.

In this example, the processing unit 602 is operable to read computer-readable instructions stored on the memory 604 and/or computer-readable media 606. The computer-readable instructions may adapt the processing unit 602 to perform the operations or functions described herein. In particular, the processing unit 602, the memory 604, and/or the computer-readable media 606 may be configured to cooperate with a sensor 624 (e.g., a rotation sensor that senses rotation of a crown component) to control the operation of a device in response to an input applied to a crown of a device (e.g., the crown 112 or any other crown described herein). The computer-readable instructions may be provided as a computer-program product, software application, or the like.

As shown in FIG. 6, the device 600 also includes a display 608. The display 608 may include a liquid-crystal display (LCD), organic light emitting diode (OLED) display, light emitting diode (LED) display, or the like. If the display 608 is an LCD, the display 608 may also include a backlight component that can be controlled to provide variable levels of display brightness. If the display 608 is an OLED or LED type display, the brightness of the display 608 may be controlled by modifying the electrical signals that are provided to display elements. The display 608 may correspond to any of the displays shown or described herein.

The device 600 may also include a battery 609 that is configured to provide electrical power to the components of the device 600. The battery 609 may include one or more power storage cells that are linked together to provide an internal supply of electrical power. The battery 609 may be operatively coupled to power management circuitry that is configured to provide appropriate voltage and power levels for individual components or groups of components within the device 600. The battery 609, via power management circuitry, may be configured to receive power from an external source, such as an AC power outlet. The battery 609 may store received power so that the device 600 may operate without connection to an external power source for an extended period of time, which may range from several hours to several days.

In some embodiments, the device 600 includes one or more input devices 610. An input device 610 is a device that is configured to receive user input. The one or more input devices 610 may include, for example, a crown input system (e.g., any of the crowns described herein), a push button, a touch-activated button, a keyboard, a keypad, or the like (including any combination of these or other components). In some embodiments, the input device 610 may provide a dedicated or primary function, including, for example, a power button, volume buttons, home buttons, scroll wheels, and camera buttons.

The device 600 may also include one or more sensors 624. The sensors 624 may detect inputs provided by a user to a crown of the device (e.g., the crown 112 or any other crown described herein). The sensors 624 may include sensing circuitry and other sensing components that facilitate sensing of rotational motion of a crown, as well as sensing circuitry and other sensing components (optionally including a switch) that facilitate sensing of translational and/or axial motion of the crown (or axial force applied to the crown). The sensors 624 may include components such as an optical sensing unit, a tactile or dome switch, or any other suitable components or sensors that may be used to provide the sensing functions described herein. The sensors 624 may also include a biometric sensor, such as a heart rate sensor, electrocardiograph sensor, temperature sensor, or any other sensor that conductively couples to the user and/or to the external environment through a crown input system, as described herein. In cases where the sensors 624 include a biometric sensor, it may include biometric sensing circuitry, as well as portions of a crown that conductively couple a user's body to the biometric sensing circuitry. Biometric sensing circuitry may include components such as processors, capacitors, inductors, transistors, analog-to-digital converters, or the like.

The device 600 may also include a touch sensor 620 that is configured to determine a location of a touch on a touch-sensitive surface of the device 600 (e.g., an input surface defined by the portion of a cover 108 over a display 109). The touch sensor 620 may use or include capacitive sensors, resistive sensors, surface acoustic wave sensors, piezoelectric sensors, strain gauges, or the like. In some cases, the touch sensor 620 associated with a touch-sensitive surface of the device 600 may include a capacitive array of electrodes or nodes that operate in accordance with a mutual-capacitance or self-capacitance scheme. The touch sensor 620 may be integrated with one or more layers of a display stack (e.g., the display 109) to provide the touch-sensing functionality of a touchscreen. Moreover, the touch sensor 620, or a portion thereof, may be used to sense motion of a user's finger as it slides along a surface of a crown, as described herein.

The device 600 may also include a force sensor 622 that is configured to receive and/or detect force inputs applied to a user input surface of the device 600 (e.g., the display 109). The force sensor 622 may use or include capacitive sensors, resistive sensors, surface acoustic wave sensors, piezoelectric sensors, strain gauges, or the like. In some cases, the force sensor 622 may include or be coupled to capacitive sensing elements that facilitate the detection of changes in relative positions of the components of the force sensor (e.g., deflections caused by a force input). The force sensor 622 may be integrated with one or more layers of a display stack (e.g., the display 109) to provide force-sensing functionality of a touchscreen.

The device 600 may also include a communication port 628 that is configured to transmit and/or receive signals or electrical communication from an external or separate device. The communication port 628 may be configured to couple to an external device via a cable, adaptor, or other type of electrical connector. In some embodiments, the communication port 628 may be used to couple the device 600 to an accessory, including a dock or case, a stylus or other input device, smart cover, smart stand, keyboard, or other device configured to send and/or receive electrical signals.

As described above, one aspect of the present technology is the gathering and use of data from a user. The present disclosure contemplates that in some instances this gathered data may include personal information data that uniquely identifies or can be used to contact or locate a specific person. Such personal information data can include demographic data, location-based data, telephone numbers, email addresses, twitter IDs (or other social media aliases or handles), home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide haptic or audiovisual outputs that are tailored to the user. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act ("HIPAA"); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of determining spatial parameters, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, haptic outputs may be provided based on non-personal information data or a bare minimum amount of personal information, such as events or states at the device associated with a user, other non-personal information, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. An electronic watch comprising:
a housing defining a side wall;
a display positioned at least partially in the housing;
an input system comprising:
  a mounting bracket coupled to the housing;
  a crown coupled to the mounting bracket and configured to rotate and translate with respect to the housing, the crown comprising:
    a knob positioned external to the housing; and
    a shaft assembly coupled to the knob and extending into the housing;
  a plate defining a first end and a second end and coupled to the mounting bracket at the first end and the second end, wherein the shaft assembly contacts the plate between the first and second ends and the plate is configured to be bent by the shaft assembly in response to a translation of the crown; and
  a strain sensing element coupled to the plate; and
a processing system operably coupled to the strain sensing element and configured to detect the translation of the crown based at least in part on a signal from the strain sensing element.

2. The electronic watch of claim 1, wherein:
the shaft assembly contacts a first side of the plate; and
the strain sensing element is coupled to a second side of the plate, opposite the first side of the plate.

3. The electronic watch of claim 1, wherein:
the crown is translatable between a default position and a pressed position; and
the plate biases the crown in the default position.

4. The electronic watch of claim 3, wherein:
the mounting bracket defines a translation path of the crown between the default position and the pressed position; and
the plate remains within an elastic deformation condition throughout the translation path of the crown.

5. The electronic watch of claim 1, wherein:
the plate comprises a metal beam;
a first end of the metal beam is coupled to the mounting bracket; and
the strain sensing element comprises a strain gauge coupled to the metal beam.

6. The electronic watch of claim 1, wherein:
the electronic watch further comprises a rotation sensing element coupled to the mounting bracket; and
the processing system is further configured to determine rotation of the crown based at least in part on information from the rotation sensing element.

7. The electronic watch of claim 1, wherein the plate is configured to be moved by the shaft assembly in response to a pivoting motion of the crown.

8. The electronic watch of claim 7, wherein:
the plate defines an opening; and
the shaft assembly defines a coupling feature that extends into the opening, wherein the coupling feature is configured to move the plate in response to the pivoting motion of the crown.

9. The electronic watch of claim 8, wherein:
the signal from the strain sensing element is a first signal; and
the processing system is further configured to detect the pivoting motion of the crown based at least in part on a second signal from the strain sensing element.

10. A wearable electronic device comprising:
a housing having a side wall;
a display coupled to the housing;
a haptic system coupled to the housing; and
an input system comprising:
a bracket assembly coupled to the housing;
a crown positioned along the side wall and comprising a shaft assembly extending through the side wall, the crown coupled to the bracket assembly and configured to rotate and translate with respect to the bracket assembly;
a plate coupled to the bracket assembly and configured to be deformed by the shaft assembly in response to translation of the crown, wherein the plate comprises a first end coupled to the bracket assembly and a second end coupled to the bracket assembly and the shaft assembly contacts the plate substantially midway between the first end and the second end; and
a strain sensing element coupled to the plate and configured to output a signal indicating a deformation of the plate.

11. The wearable electronic device of claim 10, further comprising a processing system operably coupled to the input system, wherein:
in response to the signal satisfying a threshold, the processing system is configured to register a crown press; and
in response to registering the crown press, the processing system is configured to cause the haptic system to generate a haptic output.

12. The wearable electronic device of claim 11, wherein, in response to registering the crown press, the processing system is configured to change a graphical output of the display.

13. The wearable electronic device of claim 11, further comprising a rotation sensing system configured to detect a rotation of the crown, wherein:
the haptic output is a first haptic output; and
in response to detecting the rotation of the crown with the rotation sensing system, the processing system is configured to cause the haptic system to generate a second haptic output, different from the first haptic output.

14. The wearable electronic device of claim 10, wherein the strain sensing element is coupled to the plate substantially midway between the first and second ends.

15. The wearable electronic device of claim 10, wherein the plate comprises a metal beam.

16. An electronic watch comprising:
a housing;
a display;
an input system coupled to the housing and comprising:
a bracket assembly coupled to the housing;
a crown coupled to the bracket assembly and comprising a shaft assembly extending through the housing, the crown configured to rotate and translate with respect to the housing;
a plate having a first end coupled to the bracket assembly and a second end coupled to the bracket assembly, the plate configured to be deformed in response to the shaft assembly pressing on the plate between the first end of the plate and the second end of the plate as a result of a translation of the crown; and
a strain sensing element coupled to the plate and configured to indicate a deformation of the plate; and
a processing system operably coupled to the input system and configured to change a graphical output of the display in response to the deformation of the plate satisfying a threshold.

17. The electronic watch of claim 16, further comprising a haptic system coupled to the housing and operably coupled to the processing system, wherein the processing system is configured to cause the haptic system to generate a haptic output in response to the deformation of the plate satisfying the threshold.

18. The electronic watch of claim 17, wherein:
the bracket assembly defines a translation path substantially along an axis of the shaft assembly; and
the strain sensing element is configured to detect an amount of deformation of the plate from the translation of the crown.

19. The electronic watch of claim 16, further comprising a rotation sensing system configured to detect a rotation of the crown, wherein:
the processing system causes a first graphical output at the display in response to detecting translation of the crown; and
the processing system causes a second graphical output at the display in response to detecting the rotation of the crown.

20. The electronic watch of claim 19, further comprising:
a biometric sensing system; and
a conductive member electrically coupling the crown to the biometric sensing system; and wherein:
the crown is electrically isolated from the bracket assembly; and
the crown is configured to transmit an electrical signal from a user and to the biometric sensing system.

* * * * *